US008143318B2

(12) United States Patent
Wenzel et al.

(10) Patent No.: US 8,143,318 B2
(45) Date of Patent: Mar. 27, 2012

(54) ULTRASONIC TREATMENT CHAMBER FOR PREPARING EMULSIONS

(75) Inventors: Scott W. Wenzel, Neenah, WI (US); John Glen Ahles, Neenah, WI (US); Thomas David Ehlert, Neenah, WI (US); Robert Allen Janssen, Alpharetta, GA (US); David William Koenig, Menasha, WI (US); Paul Warren Rasmussen, Neenah, WI (US); Steve Roffers, Neenah, WI (US); Shiming Zhuang, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/150,760

(22) Filed: Jun. 1, 2011

(65) Prior Publication Data
US 2011/0257068 A1    Oct. 20, 2011

Related U.S. Application Data

(63) Continuation of application No. 11/966,458, filed on Dec. 28, 2007, now abandoned.

(51) Int. Cl.
*B01F 3/08* (2006.01)
*B01F 11/02* (2006.01)

(52) U.S. Cl. ..... 516/21; 137/826; 137/828; 204/157.62; 366/127

(58) Field of Classification Search .................. 516/21; 137/826, 828; 204/157.62; 366/127
See application file for complete search history.

(56) References Cited

U.S. PATENT DOCUMENTS

| | | | |
|---|---|---|---|
| 2,115,056 A | 4/1938 | Wynn | |
| 2,307,206 A | 1/1943 | Fischer | |
| 2,584,053 A | 1/1952 | Seavey et al. | |
| 2,620,894 A | 12/1952 | Peterson et al. | |
| 2,661,192 A | 12/1953 | Horsley et al. | |
| 3,066,232 A | 6/1959 | Branson | |
| 2,946,981 A | 7/1960 | O'Neill | |
| 3,160,138 A | 12/1964 | Platzman | |
| 3,202,281 A | 8/1965 | Weston | |
| 3,239,998 A | 3/1966 | Carter et al. | |
| 3,246,881 A | 4/1966 | Davidson et al. | |
| 3,249,453 A | 5/1966 | Schnoring et al. | |
| 3,273,631 A | 9/1966 | Neuman | |
| 3,275,787 A | 9/1966 | Newberry | |
| 3,278,165 A | 10/1966 | Gaffney | |
| 3,284,991 A | 11/1966 | Ploeger et al. | |
| 3,325,348 A | 6/1967 | Bennett | |
| 3,326,470 A | 6/1967 | Loudin et al. | |
| 3,338,992 A | 8/1967 | Kinney | |
| 3,341,394 A | 9/1967 | Kinney | |
| 3,425,951 A | 2/1969 | Ishiwata | |
| 3,463,321 A | 8/1969 | VanIngen | |
| 3,479,873 A | 11/1969 | Hermanns | |
| 3,490,584 A | 1/1970 | Balamuth | |
| 3,502,763 A | 3/1970 | Hartmann | |
| 3,519,251 A | 7/1970 | Hammitt et al. | |
| 3,542,345 A | 11/1970 | Kuris | |
| 3,542,615 A | 11/1970 | Dobo et al. | |
| 3,567,185 A | 3/1971 | Ross et al. | |
| 3,591,946 A | 7/1971 | Loe | |
| 3,664,191 A | 5/1972 | Hermanns | |
| 3,692,618 A | 9/1972 | Dorschner et al. | |
| 3,782,547 A | 1/1974 | Dietert | |
| 3,802,817 A | 4/1974 | Matsuki et al. | |
| 3,865,350 A | 2/1975 | Burtis | |
| 3,873,071 A | 3/1975 | Tatebe | |
| 3,904,392 A | 9/1975 | VanIngen et al. | |
| 4,035,151 A | 7/1977 | Czerny et al. | |
| 4,062,768 A | 12/1977 | Elliott | |
| 4,070,167 A | 1/1978 | Barbee et al. | |
| 4,118,797 A * | 10/1978 | Tarpley, Jr. | 366/127 |
| 4,122,797 A | 10/1978 | Kawamura et al. | |
| 4,168,295 A | 9/1979 | Sawyer | |
| 4,218,221 A | 8/1980 | Cottell | |
| 4,249,986 A | 2/1981 | Obeda | |
| 4,259,021 A | 3/1981 | Goudy, Jr. | |
| 4,260,389 A | 4/1981 | Lister | |
| 4,266,879 A | 5/1981 | McFall | |
| 4,340,563 A | 7/1982 | Appel et al. | |
| 4,372,296 A | 2/1983 | Fahim | |

(Continued)

FOREIGN PATENT DOCUMENTS

CA    2175065    5/1995

(Continued)

OTHER PUBLICATIONS

Non-Final Office action issued in U.S. Appl. No. 11/963,139, dated Feb. 18, 2011.

(Continued)

*Primary Examiner* — Ling Choi
*Assistant Examiner* — Chun-Cheng Wang
(74) *Attorney, Agent, or Firm* — Armstrong Teasdale LLP

(57) ABSTRACT

An ultrasonic mixing system having a treatment chamber in which at least two separate phases can be mixed to prepare an emulsion is disclosed. Specifically, at least one phase is a dispersed phase and one phase in a continuous phase. The treatment chamber has an elongate housing through which the phases flow longitudinally from a first inlet port and a second inlet port, respectively, to an outlet port thereof. An elongate ultrasonic waveguide assembly extends within the housing and is operable at a predetermined ultrasonic frequency to ultrasonically energize the phases within the housing. An elongate ultrasonic horn of the waveguide assembly is disposed at least in part intermediate the inlet and outlet ports, and has a plurality of discrete agitating members in contact with and extending transversely outward from the horn intermediate the inlet and outlet ports in longitudinally spaced relationship with each other. The horn and agitating members are constructed and arranged for dynamic motion of the agitating members relative to the horn at the predetermined frequency and to operate in an ultrasonic cavitation mode of the agitating members corresponding to the predetermined frequency and the phases being mixed in the chamber.

14 Claims, 2 Drawing Sheets

U.S. PATENT DOCUMENTS

| | | | |
|---|---|---|---|
| 4,398,925 A | 8/1983 | Trinh et al. |
| 4,425,718 A | 1/1984 | Kawaguchi |
| 4,511,254 A | 4/1985 | North et al. |
| 4,556,467 A | 12/1985 | Kuhn et al. |
| 4,612,016 A | 9/1986 | Jaeger et al. |
| 4,612,018 A | 9/1986 | Tsuboi et al. |
| 4,663,220 A | 5/1987 | Wisneski et al. |
| 4,673,512 A | 6/1987 | Schram |
| 4,693,879 A | 9/1987 | Yoshimura et al. |
| 4,699,636 A | 10/1987 | Bofinger et al. |
| 4,706,509 A | 11/1987 | Riebel |
| 4,708,878 A | 11/1987 | Hagelauer et al. |
| 4,726,522 A | 2/1988 | Kokubo et al. |
| 4,743,361 A | 5/1988 | Schram |
| 4,848,159 A | 7/1989 | Kennedy et al. |
| 4,877,516 A | 10/1989 | Schram |
| 4,879,011 A | 11/1989 | Schram |
| 4,929,279 A | 5/1990 | Hays |
| RE33,524 E | 1/1991 | Schram |
| 4,983,045 A | 1/1991 | Taniguchi |
| 5,006,266 A | 4/1991 | Schram |
| 5,026,167 A | 6/1991 | Berliner, III |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,242,557 A | 9/1993 | Jones et al. |
| 5,258,413 A | 11/1993 | Isayev |
| 5,269,297 A | 12/1993 | Weng et al. |
| 5,326,164 A | 7/1994 | Logan |
| 5,330,100 A | 7/1994 | Malinowski |
| 5,335,449 A | 8/1994 | Beatty |
| 5,372,634 A | 12/1994 | Monahan |
| 5,373,212 A | 12/1994 | Beau |
| 5,375,926 A | 12/1994 | Omasa |
| 5,391,000 A | 2/1995 | Taniguchi |
| 5,466,722 A | 11/1995 | Stoffer et al. |
| 5,519,670 A | 5/1996 | Walter |
| 5,536,921 A | 7/1996 | Hedrick et al. |
| 5,583,292 A | 12/1996 | Karbach et al. |
| 5,585,565 A | 12/1996 | Glascock et al. |
| 5,665,383 A | 9/1997 | Grinstaff et al. |
| 5,681,457 A | 10/1997 | Mahoney |
| 5,711,888 A | 1/1998 | Trampler et al. |
| 5,770,124 A | 6/1998 | Marecki et al. |
| 5,803,270 A | 9/1998 | Brodeur |
| 5,810,037 A | 9/1998 | Sasaki et al. |
| 5,831,166 A | 11/1998 | Kozuka et al. |
| 5,853,456 A | 12/1998 | Bryan et al. |
| 5,868,153 A | 2/1999 | Cohen et al. |
| 5,873,968 A | 2/1999 | Pike et al. |
| 5,902,489 A | 5/1999 | Yasuda et al. |
| 5,916,203 A | 6/1999 | Brandon et al. |
| 5,922,355 A | 7/1999 | Parikh et al. |
| 5,935,883 A | 8/1999 | Pike et al. |
| 5,937,906 A | 8/1999 | Kozyuk |
| 5,964,926 A | 10/1999 | Cohen |
| 5,979,664 A | 11/1999 | Brodeur |
| 6,010,592 A | 1/2000 | Jameson et al. |
| 6,020,277 A | 2/2000 | Jameson |
| 6,035,897 A | 3/2000 | Kozyuk |
| 6,053,028 A | 4/2000 | Kraus, Jr. et al. |
| 6,053,424 A | 4/2000 | Gipson et al. |
| 6,055,859 A | 5/2000 | Kozuka et al. |
| 6,060,416 A | 5/2000 | Kobata et al. |
| 6,074,466 A | 6/2000 | Iwasa |
| 6,090,731 A | 7/2000 | Pike et al. |
| 6,106,590 A | 8/2000 | Ueno et al. |
| 6,169,045 B1 | 1/2001 | Pike et al. |
| 6,200,486 B1 | 3/2001 | Chahine et al. |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Gallego Juarez et al. |
| 6,315,215 B1 | 11/2001 | Gipson et al. |
| 6,322,240 B1 | 11/2001 | Omasa |
| 6,332,541 B1 | 12/2001 | Coakley et al. |
| 6,361,697 B1 | 3/2002 | Coury et al. |
| 6,368,414 B1 | 4/2002 | Johnson |
| 6,380,264 B1 | 4/2002 | Jameson et al. |
| 6,383,301 B1 | 5/2002 | Bell et al. |
| 6,450,417 B1 | 9/2002 | Gipson et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,547,903 B1 | 4/2003 | McNichols et al. |
| 6,547,935 B2 | 4/2003 | Scott |
| 6,547,951 B1 | 4/2003 | Maekawa |
| 6,551,607 B1 | 4/2003 | Minerath, III et al. |
| 6,576,042 B2 | 6/2003 | Kraus et al. |
| 6,582,611 B1 | 6/2003 | Kerfoot |
| 6,593,436 B2 | 7/2003 | Austin et al. |
| 6,605,252 B2 | 8/2003 | Omasa |
| 6,620,226 B2 | 9/2003 | Hutton et al. |
| 6,624,100 B1 | 9/2003 | Pike |
| 6,627,265 B2 | 9/2003 | Kutilek |
| 6,655,826 B1 | 12/2003 | Leanos |
| 6,659,365 B2 | 12/2003 | Gipson et al. |
| 6,676,003 B2 | 1/2004 | Ehlert et al. |
| 6,689,730 B2 | 2/2004 | Senapati et al. |
| 6,739,524 B2 | 5/2004 | Taylor-McCune et al. |
| 6,770,600 B1 | 8/2004 | Lamola et al. |
| 6,817,541 B2 | 11/2004 | Sands et al. |
| 6,818,128 B2 | 11/2004 | Minter |
| 6,837,445 B1 | 1/2005 | Tsai |
| 6,841,921 B2 | 1/2005 | Stegelmann |
| 6,858,181 B2 | 2/2005 | Aoyagi |
| 6,878,288 B2 | 4/2005 | Scott |
| 6,883,724 B2 | 4/2005 | Adiga et al. |
| 6,889,528 B2 | 5/2005 | Sen et al. |
| 6,890,593 B2 | 5/2005 | Tian |
| 6,897,628 B2 | 5/2005 | Gunnerman et al. |
| 6,902,650 B2 | 6/2005 | Park et al. |
| 6,911,153 B2 | 6/2005 | Minter |
| 6,929,750 B2 | 8/2005 | Laurell et al. |
| 6,935,770 B2 | 8/2005 | Schueler |
| 6,936,151 B1 | 8/2005 | Lock et al. |
| 7,018,546 B2 | 3/2006 | Kurihara et al. |
| 7,083,322 B2 | 8/2006 | Moore et al. |
| 7,083,764 B2 | 8/2006 | Scott |
| 7,090,391 B2 | 8/2006 | Tanigchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,293,909 B2 | 11/2007 | Tanigchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |
| 7,438,875 B2 | 10/2008 | Do et al. |
| 7,465,426 B2 | 12/2008 | Kerherve et al. |
| 7,504,075 B2 | 3/2009 | Marhasin |
| 7,516,664 B2 | 4/2009 | Meier et al. |
| 7,533,830 B1 | 5/2009 | Rose |
| 7,582,156 B2 | 9/2009 | Tanaka et al. |
| 7,597,277 B2 | 10/2009 | Kawakami et al. |
| 7,673,516 B2 | 3/2010 | Janssen et al. |
| 7,703,698 B2 | 4/2010 | Janssen et al. |
| 7,712,353 B2 | 5/2010 | Janssen et al. |
| 7,735,751 B2 | 6/2010 | Ehlert et al. |
| 7,780,743 B2 | 8/2010 | Greaves et al. |
| 7,785,674 B2 | 8/2010 | Janssen et al. |
| 2001/0040935 A1 | 11/2001 | Case |
| 2002/0036173 A1 | 3/2002 | Feke et al. |
| 2002/0164274 A1 | 11/2002 | Haggett et al. |
| 2003/0042174 A1 | 3/2003 | Austin |
| 2003/0047067 A1 | 3/2003 | Kraus et al. |
| 2003/0048692 A1 | 3/2003 | Cohen et al. |
| 2003/0051989 A1 | 3/2003 | Austin |
| 2003/0061939 A1 | 4/2003 | Hutton et al. |
| 2003/0066899 A1 | 4/2003 | Gipson et al. |
| 2003/0116014 A1 | 6/2003 | Possanza et al. |

| | | | |
|---|---|---|---|
| 2003/0143110 | A1 | 7/2003 | Kritzler et al. |
| 2003/0194692 | A1 | 10/2003 | Purdum |
| 2003/0234173 | A1 | 12/2003 | Minter |
| 2004/0022695 | A1 | 2/2004 | Simon et al. |
| 2004/0065599 | A1 | 4/2004 | Lal et al. |
| 2004/0079580 | A1 | 4/2004 | Manna et al. |
| 2004/0120904 | A1 | 6/2004 | Lye et al. |
| 2004/0142041 | A1 | 7/2004 | MacDonald et al. |
| 2004/0187524 | A1 | 9/2004 | Sen et al. |
| 2004/0202728 | A1 | 10/2004 | Shanker et al. |
| 2005/0000914 | A1 | 1/2005 | Dahlberg et al. |
| 2005/0008560 | A1 | 1/2005 | Kataoka et al. |
| 2005/0017599 | A1 | 1/2005 | Puskas |
| 2005/0025797 | A1 | 2/2005 | Wang et al. |
| 2005/0082234 | A1 | 4/2005 | Solenthaler |
| 2005/0084438 | A1 | 4/2005 | Do et al. |
| 2005/0084464 | A1 | 4/2005 | McGrath et al. |
| 2005/0085144 | A1 | 4/2005 | MacDonald et al. |
| 2005/0092931 | A1 | 5/2005 | Gadgil et al. |
| 2005/0129161 | A1 | 6/2005 | Laberge |
| 2005/0207431 | A1 | 9/2005 | Monai |
| 2005/0235740 | A1 | 10/2005 | Desie et al. |
| 2005/0260106 | A1 | 11/2005 | Marhasin |
| 2006/0000034 | A1 | 1/2006 | McGrath |
| 2006/0008442 | A1 | 1/2006 | MacDonald et al. |
| 2006/0120212 | A1 | 6/2006 | Taniguchi et al. |
| 2007/0114306 | A1 | 5/2007 | Kawakami et al. |
| 2007/0119785 | A1 | 5/2007 | Englehardt et al. |
| 2007/0131034 | A1 | 6/2007 | Ehlert et al. |
| 2007/0170277 | A1 | 7/2007 | Ehlert et al. |
| 2008/0061000 | A1 | 3/2008 | Janssen et al. |
| 2008/0062811 | A1 | 3/2008 | Janssen et al. |
| 2008/0063718 | A1 | 3/2008 | Janssen et al. |
| 2008/0067418 | A1 | 3/2008 | Ross |
| 2008/0069887 | A1 | 3/2008 | Baran et al. |
| 2008/0117711 | A1 | 5/2008 | Omasa |
| 2008/0155763 | A1 | 7/2008 | Janssen et al. |
| 2008/0156737 | A1 | 7/2008 | Janssen et al. |
| 2008/0159063 | A1 | 7/2008 | Janssen et al. |
| 2008/0192568 | A1 | 8/2008 | Hielscher et al. |
| 2008/8251375 | | 10/2008 | Hielscher et al. |
| 2009/0014377 | A1 | 1/2009 | Janssen et al. |
| 2009/0147905 | A1 | 6/2009 | Janssen et al. |
| 2009/0155091 | A1 | 6/2009 | Ehlert |
| 2009/0158936 | A1 | 6/2009 | Janssen et al. |
| 2009/0162258 | A1 | 6/2009 | Janssen et al. |
| 2009/0165654 | A1 | 7/2009 | Koenig et al. |
| 2009/0166177 | A1 | 7/2009 | Wenzel et al. |
| 2009/0168590 | A1 | 7/2009 | Koenig et al. |
| 2009/0168591 | A1 | 7/2009 | Wenzel et al. |
| 2009/0262597 | A1 | 10/2009 | Kieffer et al. |
| 2010/0150859 | A1 | 6/2010 | Do et al. |
| 2010/0206742 | A1 | 8/2010 | Janssen et al. |
| 2010/0296975 | A1 | 11/2010 | Peshkovsky et al. |

FOREIGN PATENT DOCUMENTS

| | | | |
|---|---|---|---|
| CH | 657067 | | 8/1986 |
| CN | 1535249 | A | 10/2004 |
| CN | 1556120 | | 12/2004 |
| CN | 1247628 | | 3/2006 |
| CN | 101153138 | | 4/2008 |
| DE | 262553 | A3 | 12/1988 |
| DE | 9017338 | | 3/1991 |
| DE | 4444525 | A1 | 6/1996 |
| DE | 19854013 | | 5/2000 |
| DE | 19913397 | | 9/2000 |
| DE | 19938254 | | 2/2001 |
| DE | 29825063 | | 6/2004 |
| DE | 102004040233 | | 3/2006 |
| DE | 102005025118 | | 1/2007 |
| DE | 1020050334629 | | 1/2007 |
| EP | 0269941 | A1 | 6/1988 |
| EP | 0292470 | | 11/1988 |
| EP | 347891 | | 12/1989 |
| EP | 0457187 | A2 | 11/1991 |
| EP | 0459967 | | 12/1991 |
| EP | 0625482 | | 11/1994 |
| EP | 0648531 | | 4/1995 |
| EP | 0648531 | A1 | 4/1995 |
| EP | 0894612 | A2 | 2/1999 |
| EP | 1954388 | | 3/2007 |
| EP | 0983968 | | 3/2008 |
| EP | 2173669 | A2 | 4/2010 |
| EP | 2176173 | A2 | 4/2010 |
| FR | 2793811 | | 11/2000 |
| GB | 1404575 | | 9/1975 |
| JP | 56028221 | | 3/1981 |
| JP | 57119853 | | 7/1982 |
| JP | 58034051 | | 2/1983 |
| JP | 62001413 | A | 1/1987 |
| JP | 62039839 | U | 3/1987 |
| JP | 6372364 | | 4/1988 |
| JP | 63104664 | | 5/1988 |
| JP | 1108081 | | 4/1989 |
| JP | 2025602 | | 1/1990 |
| JP | 02281185 | A | 11/1990 |
| JP | 03053195 | A | 3/1991 |
| JP | 3086258 | | 4/1991 |
| JP | 03-157129 | A | 5/1991 |
| JP | 6228824 | | 8/1994 |
| JP | 8304388 | | 11/1996 |
| JP | 9286943 | | 11/1997 |
| JP | 10060331 | | 3/1998 |
| JP | 11133661 | | 5/1999 |
| JP | 2000158364 | | 12/1999 |
| JP | 2001017970 | | 1/2001 |
| JP | 2001252588 | | 9/2001 |
| JP | 20020073778 | A | 9/2002 |
| JP | 2003103152 | A | 4/2003 |
| JP | 2004020176 | | 1/2004 |
| JP | 2004256783 | | 9/2004 |
| JP | 2005118688 | | 5/2005 |
| KR | 1020050105858 | A | 2/2005 |
| KR | 1020050113356 | A | 12/2005 |
| SU | 203582 | A | 1/1967 |
| WO | 9400757 | | 1/1994 |
| WO | 9420833 | | 9/1994 |
| WO | 9429873 | A | 12/1994 |
| WO | 9600318 | | 1/1996 |
| WO | 9609112 | A1 | 3/1996 |
| WO | 9743026 | | 11/1997 |
| WO | 9817373 | | 4/1998 |
| WO | 9844058 | | 10/1998 |
| WO | 9933520 | | 7/1999 |
| WO | 0004978 | | 2/2000 |
| WO | 0041794 | | 7/2000 |
| WO | 0139200 | A | 5/2001 |
| WO | 0222252 | | 3/2002 |
| WO | 0250511 | | 6/2002 |
| WO | 03012800 | | 2/2003 |
| WO | 03102737 | | 12/2003 |
| WO | 2004026452 | | 4/2004 |
| WO | 2004064487 | A2 | 8/2004 |
| WO | 2005011804 | | 2/2005 |
| WO | WO2005080668 | A2 | 8/2005 |
| WO | 2006037591 | | 4/2006 |
| WO | 2006043970 | A2 | 4/2006 |
| WO | 2006073645 | A1 | 7/2006 |
| WO | 2006074921 | A1 | 7/2006 |
| WO | 2006093804 | | 9/2006 |
| WO | 2007011520 | A2 | 1/2007 |
| WO | 2007060245 | A1 | 5/2007 |
| WO | 2007095871 | | 8/2007 |
| WO | 2008029379 | | 3/2008 |
| WO | 2008047259 | | 4/2008 |
| WO | 2008085806 | | 7/2008 |

OTHER PUBLICATIONS

Non-Final Office action issued in U.S. Appl. No. 11/777,140, dated Feb. 23, 2011.

Non-Final Office action issued in U.S. Appl. No. 11/777,151, mailed Dec. 8, 2010.

Final Office action issued in U.S. Appl. No. 11/966,418, mailed Jan. 12, 2011.

Final Office action issued in U.S. Appl. No. 11/966,447, mailed Jan. 12, 2011.

Supplementary European Search Report issued in EP Application No. 08789242, mailed Dec. 17, 2010.
Non-final Office action submitted in U.S. Appl. No. 12/704,058, mailed Dec. 9, 2010.
Non-final Office action submitted in U.S. Appl. No. 11/530,183, mailed Oct. 13, 2010.
Kuo et al., "Nano-particles dispersion effect on Ni/Al2O3 Composite Coatings," Materials Chemistry and Physics, 86: 5-10 (2004).
Sivakumar et al., "Preparation of nanosized TiO2 supported on activated alumina by a sonochemical method: observation of an increased photocatalytic decolourisation efficiency," Research on Chemical Intermediates, 30(7-8): 785-792 (2004).
Non-final Office action issued in related U.S. Appl. No. 11/530,210, on Jun. 28, 2010.
Non-final Office action issued in related U.S. Appl. No. 11/530,210, on Dec. 1, 2010.
Final Office action issued in related U.S. Appl. No. 11/777,140, on Dec. 1, 2010.
Letter regarding the Office action issued for Mexican Patent Application Serial No. MX/a/2009/002519, mailed on Oct. 12, 2010.
Non-final Office action issued in related U.S. Appl. No. 11/777,140, on Aug. 9, 2010.
Non-final Office action issued in related U.S. Appl. No. 11/966,418, on Aug. 2, 2010.
Non-final Office action issued in related U.S. Appl. No. 11/966,447, on Aug. 2, 2010.
Non-final Office action regarding U.S. Appl. No. 11/963,237, dated Jul. 8, 2010.
Morgiguchi, Takehi et al., "Metal-modified silica absorbents for removal of humic substances in water." Journal of Colloid and Interface Science 283, 2005 300-310, See Abstract, pp. 301 and 304.
International Search Report and Written Opinion regarding PCT/IB2009/055090 dated Jul. 16, 2010.
International Search Report and Written Opinion regarding PCT/IB2009/055092, dated Jul. 16, 2010.
Non-Final Office action regarding U.S. Appl. No. 11/530,183, dated Apr. 19, 2010.
Final Office action regarding U.S. Appl. No. 11/965,435, on Mar. 11, 2010.
English translation of Nagel WO 2006/074921 A1, accessed on the EPO website, Jul. 20, 2006.
Non-Final Office action regarding U.S. Appl. No. 12/335,231, dated Oct. 15, 2009.
European Office action regarding European Application No. 07805228.9, dated Oct. 9, 2009.
International Search Report and Written Opinion regarding PCT/IB2008/055394, dated Sep. 28, 2009.
Blume, T. and Neis, U.,"Improved wastewater disinfection by ultrasonic pre-treatment." Ultrasonics Sonochemistry, 2004, No. 11, pp. 333-336.
International Search Report and Written Opinion regarding PCT/IB2008/055395, dated Sep. 14, 2009.
International Search Report and Written Opinion regarding PCT/IB2008/055514, dated Aug. 25, 2009.
International Search Report and Written Opinion issued Aug. 18, 2009 for PCT/IB2008/055520.
International Search Report and Written Opinion issued Aug. 18, 2009 for PCT/IB2008/055517.
International Search Report and Written Opinion issued Aug. 18, 2009 for PCT/IB2008/055518.
International Search Report and Written Opinion regarding PCT/IB2008/055396, dated Jul. 29, 2009.
Non-final Office action regarding U.S. Appl. No. 11/617,497, dated Jun. 26, 2009.
Final Office action regarding U.S. Appl. No. 11/530,311, dated Jun. 23, 2009.
Non-final Office action regarding U.S. Appl. No. 11/950,943, dated May 1, 2009.
Lawson, J.D., "Some Criteria for a Power Producing Themonuclear Reactor", Proc. Phys. Soc. B70, pp. 6-10(1957).
Artsimovich, L.A., "Controlled Thermonuclear Reactions", Gordon and Breach Science Publishers, New York, first English translation, 1964.
Morrison, D.R.O., "Cold Fusion Update No. 9", Jan. 1994, from Newsgroups sci.physics.fusion, http://ww.groups.google.com.
Brenner et al., "Single-bubble sonoluminescence", Reviews of Modern Physics, vol. 74, Apr. 2002, pp. 425-484.
Lister, J., Plasma Physics and Controlled Fusion 48, pp. 715-716 (2006).
U.S. Department of Energy, "Report of the Review of Low Energy Nuclear Reactions", Dec. 1, 2004 (USDOE).
Non-Final Office action regarding U.S. Appl. No. 11/617,515, dated Mar. 27, 2009.
International Search Report and Written Opinion from PCT/IB2008/052766, dated Mar. 31, 2009.
International Search Report and Written Opinion for PCT/IB2008/052764, dated Apr. 2, 2009.
International Search Report and Written Opinion regarding PCT/IB2008/052760, dated Feb. 17, 2009.
International Search Report and Written Opinion regarding PCT/IB2008/055051, dated Feb. 20, 2009.
Non-Final Office action regarding U.S. Appl. No. 11/530,311, dated Nov. 5, 2008.
International Search Report and Written Opinion regarding PCT/IB2007/054892, dated May 15, 2008.
International Search Report and Written Opinion regarding PCT/IB2007/054898, dated May 15, 2008.
International Search Report and Written Opinion regarding PCT/IB2007/052947, dated Mar. 12, 2008.
International Search Report and Written Opinion regarding PCT/IB2007/052945, dated Feb. 1, 2008.
International Search Report and Written Opinion regarding PCT/IB2007/052988, dated Feb. 14, 2008.
International Search Report and Written Opinion regarding PCT/IB2007/053621, dated Feb. 14, 2008.
International Search Report and Written Opinion regarding PCT/IB2007/053623, dated Feb. 14, 2008.
International Search Report and Written Opinion regarding PCT/IB2007/053622, dated Feb. 14, 2008.
U.S. Appl. No. 11/777,140, filed Jul. 12, 2007.
U.S. Appl. No. 11/617,497, filed Dec. 28, 2006.
U.S. Appl. No. 11/617,515, filed Dec. 28, 2006.
U.S. Appl. No. 11/777,151, filed Jul. 12, 2007.
U.S. Appl. No. 11/950,943, filed Dec. 5, 2007.
U.S. Appl. No. 11/963,139, filed Dec. 21, 2007.
U.S. Appl. No. 11/963,237, filed Dec. 21, 2007.
U.S. Appl. No. 11/966,472, filed Dec. 28, 2007.
U.S. Appl. No. 11/966,418, filed Dec. 28, 2007.
U.S. Appl. No. 11/966,447, filed Dec. 28, 2007.
U.S. Appl. No. 11/777,145, filed Dec. 12, 2007.
U.S. Appl. No. 11/965,435, filed Dec. 27, 2007.
U.S. Appl. No. 11/530,311, filed Sep. 8, 2006.
Final Office action issued in U.S. Appl. No. 12/335,231, dated Mar. 31, 2011.
Final Office action issued in U.S. Appl. No. 11/530,183, dated Mar. 22, 2011.
Non-Final Office action issued in U.S. Appl. No. 11/966,472, dated Mar. 31, 2011.
Final Office action issued in U.S. Appl. No. 11/530,210, dated Apr. 19, 2011.
Final Office Action Issued for U.S. Appl. No. 11/530,210 mailed Apr. 19, 2011.
First Office Action for China Patent Application No. 20088016947.3, dated Jun. 24, 2011.
First Office Action for Russian Patent Application No. 2009112526, dated Apr. 28, 2011.
Final Office Action issued for U.S. Appl. No. 11/530,210, mailed Jul. 1, 2011.
Non-Final Office Action issued for U.S. Appl. No. 12/335,231, mailed Jul. 13, 2011.
Non-Final Office Action issued for U.S. Appl. No. 12/335,176, mailed Jul. 13, 2011.
Non-Final Office Action issued for U.S. Appl. No. 11/963,139, mailed Jun. 15, 2011.
First Office Action for China Patent Application No. 200880121407.2, dated Aug. 24, 2011.

* cited by examiner

ULTRASONIC TREATMENT CHAMBER FOR PREPARING EMULSIONS

REFERENCE TO RELATED APPLICATION

This patent application is a continuation patent application of U.S. patent application Ser. No. 11/966,458 filed on Dec. 28, 2007, now abandoned.

FIELD OF DISCLOSURE

The present disclosure relates generally to systems for ultrasonically mixing various phases to prepare an emulsion. More particularly an ultrasonic mixing system is disclosed for ultrasonically mixing at least a first phase and a second phase to prepare an emulsion.

BACKGROUND OF DISCLOSURE

Many currently used products consist of one or more emulsions. Specifically, there is a large array of cosmetic emulsions utilized for application of skin health benefits to the skin, hair, and body of a user. Additionally, many other emulsions are used to provide benefits to inanimate objects such as, for example, cleaning countertops, glass, and the like. Generally, emulsions consist of a dispersed phase and a continuous phase and are generally formed with the addition of a surfactant or a combination of surfactants with varying hydrophilic/lipopilic balances (HLB). Although emulsions are useful, current mixing procedures have multiple problems, which can waste time, energy, and money for manufacturers of these emulsions.

Specifically, emulsions are currently prepared in a batch-type process, either by a cold mix or a hot mix procedure. The cold mix procedure generally consists of multiple ingredients or phases being added into a kettle in a sequential order with agitation being applied via a blade, baffles, or a vortex. The hot mix procedure is conducted similarly to the cold mix procedure with the exception that the ingredients or phases are generally heated above room temperature, for example to temperatures of from about 40 to about 100° C., prior to mixing, and are then cooled back to room temperature after the ingredients and phases have been mixed. In both procedures, the various phases are added manually by one of a number of methods including dumping, pouring, and/or sifting.

These conventional methods of mixing phases into emulsions have several problems. For example, as noted above, all phases are manually added in a sequential order. Prior to adding the phases, the ingredients for each phase need to be weighed, which can create human error. Specifically, as the ingredients need to be weighed one at a time, misweighing can occur with the additive amounts. Furthermore, by manually adding the ingredients, there is a risk of spilling or of incomplete transfers of the ingredients from one container to the next.

One other major issue with conventional methods of mixing phases to prepare emulsions is that batching processes (e.g., cold and hot mix procedures described above) require heating times, mixing times, and additive times that are entirely manual and left up to the individual compounders to follow the instructions. These practices can lead to inconsistencies from batch-to-batch and from compounder to compounder. Furthermore, these procedures required several hours to complete, which can get extremely expensive.

Based on the foregoing, there is a need in the art for a mixing system that provides ultrasonic energy to enhance the mixing of two or more phases into emulsions. Furthermore, it would be advantageous if the system could be configured to enhance the cavitation mechanism of the ultrasonics, thereby increasing the probability that the phases will be effectively mixed to form the emulsions.

SUMMARY OF DISCLOSURE

In one aspect, an ultrasonic mixing system for mixing at least two phases to prepare an emulsion generally comprises a treatment chamber comprising an elongate housing having longitudinally opposite ends and an interior space. The housing is generally closed at least one of its longitudinal ends and has at least a first inlet port for receiving at least a first phase into the interior space of the housing, and a second inlet port for receiving at least a second phase into the interior space of the housing, and at least one outlet port through which an emulsion is exhausted from the housing following ultrasonic mixing of the first and second phases. The outlet port is spaced longitudinally from the first and second inlet ports such that liquid (i.e., first and/or second phases) flows longitudinally within the interior space of the housing from the first and second inlet ports to the outlet port. In one embodiment, the housing includes more than two separate ports for receiving additional phases to be mixed to prepare the emulsion. At least one elongate ultrasonic waveguide assembly extends longitudinally within the interior space of the housing and is operable at a predetermined ultrasonic frequency to ultrasonically energize and mix the first and second phases (and any additional phases) flowing within the housing.

The waveguide assembly generally comprises an elongate ultrasonic horn disposed at least in part intermediate the first and second inlet ports and the outlet port of the housing and has an outer surface located for contact with the first and second phases flowing within the housing from the first and second inlet ports to the outlet port. A plurality of discrete agitating members are in contact with and extend transversely outward from the outer surface of the horn intermediate the first and second inlet ports and the outlet port in longitudinally spaced relationship with each other. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the first and second phases being mixed within the chamber.

As such the present disclosure is directed to an ultrasonic mixing system for preparing an emulsion. The mixing system comprises a treatment chamber comprising an elongate housing having longitudinally opposite ends and an interior space, and an elongate ultrasonic waveguide assembly extending longitudinally within the interior space of the housing and being operable at a predetermined ultrasonic frequency to ultrasonically energize and mix a first and a second phase flowing within the housing to prepare the emulsion. The housing is closed at least one of its longitudinal ends and has at least a first inlet port for receiving a first phase into the interior space of the housing, and a second inlet port for receiving a second phase into the interior space of the housing, and at least one outlet port through which an emulsion is exhausted from the housing following ultrasonic mixing of the first and second phases. The outlet port is spaced longitudinally from the first and second inlet ports such that first and second phases flow longitudinally within the interior space of the housing from the first and second inlet ports to the outlet port.

The waveguide assembly comprises an elongate ultrasonic horn disposed at least in part intermediate the first and second inlet ports and the outlet port of the housing and having an outer surface located for contact with the first and second phases flowing within the housing from the first and second inlet ports to the outlet port. Additionally, the waveguide assembly comprises a plurality of discrete agitating members in contact with and extending transversely outward from the outer surface of the horn intermediate the first and second inlet ports and the outlet port in longitudinally spaced relationship with each other. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the first and second phases being mixed in the chamber.

The present invention is further directed to an ultrasonic mixing system for preparing an oil-in-water emulsion. The mixing system comprises a treatment chamber comprising an elongate housing having longitudinally opposite ends and an interior space, and an elongate ultrasonic waveguide assembly extending longitudinally within the interior space of the housing and being operable at a predetermined ultrasonic frequency to ultrasonically energize and mix an oil phase and a water phase flowing within the housing. The housing is generally closed at least one of its longitudinal ends and has at least a first inlet port for receiving the oil phase into the interior space of the housing, and a second inlet port for receiving the water phase into the interior space of the housing, and at least one outlet port through which an oil-in-water emulsion is exhausted from the housing following ultrasonic mixing of the oil phase and water phase. The outlet port is spaced longitudinally from the first and second inlet ports such that the oil and water phases flow longitudinally within the interior space of the housing from the first and second inlet ports to the outlet port.

The waveguide assembly comprises an elongate ultrasonic horn disposed at least in part intermediate the first and second inlet ports and the outlet port of the housing and having an outer surface located for contact with the oil and water phases flowing within the housing from the first and second inlet ports to the outlet port; a plurality of discrete agitating members in contact with and extending transversely outward from the outer surface of the horn intermediate the first and second inlet ports and the outlet port in longitudinally spaced relationship with each other; and a baffle assembly disposed within the interior space of the housing and extending at least in part transversely inward from the housing toward the horn to direct longitudinally flowing oil and water phases in the housing to flow transversely inward into contact with the agitating members. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the oil phase and water phase being mixed in the chamber.

The present disclosure is further directed to a method for preparing an emulsion using the ultrasonic mixing system described above. The method comprises delivering the first phase via the first inlet port into the interior space of the housing; delivering the second phase via the second inlet port into the interior space of the housing; and ultrasonically mixing the first and second phases via the elongate ultrasonic waveguide assembly operating in the predetermined ultrasonic frequency.

Other features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
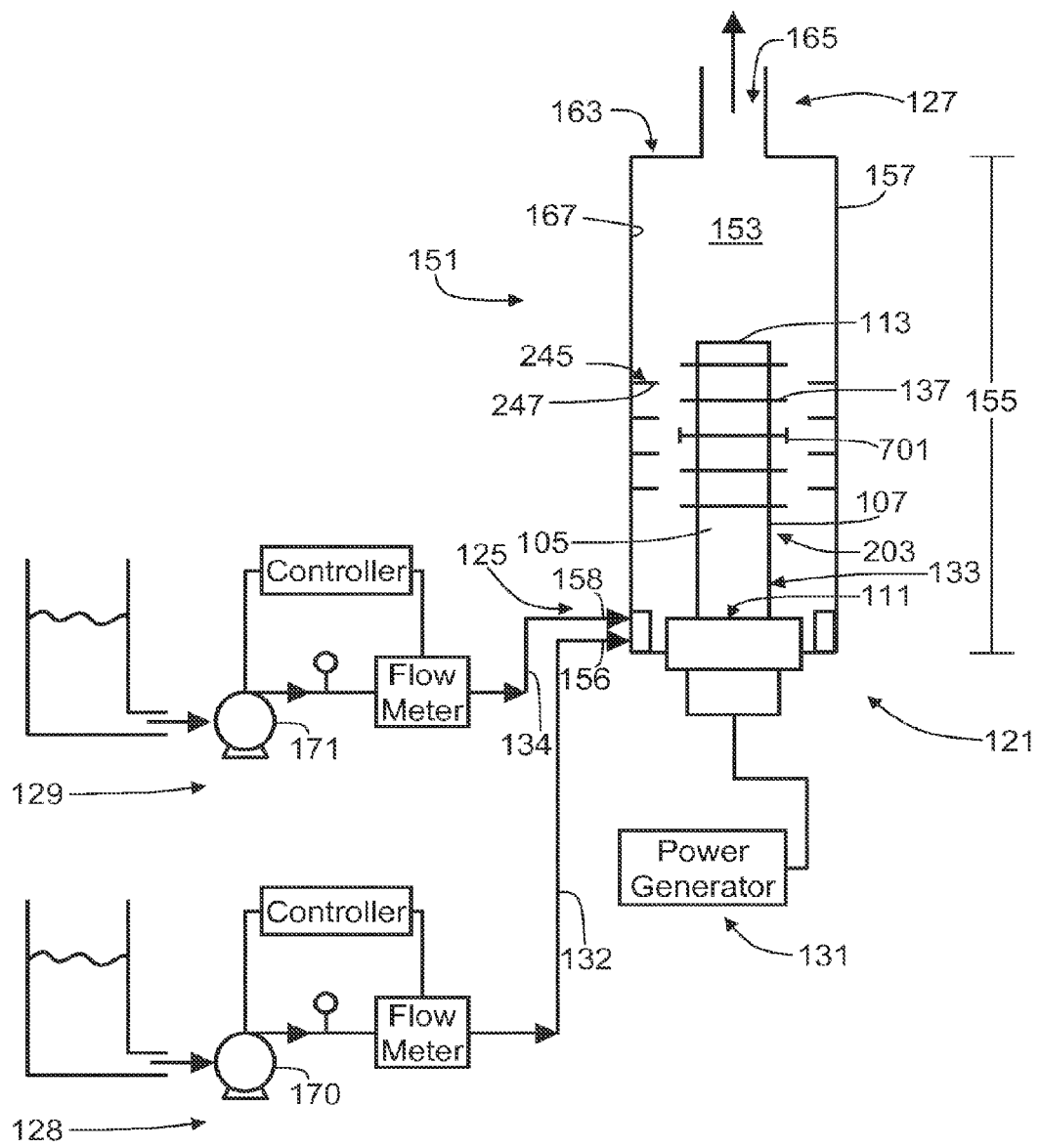
FIG. 1 is a schematic of an ultrasonic mixing system according to a first embodiment of the present disclosure for preparing an emulsion.

With particular reference now to FIG. 1, in one embodiment, an ultrasonic mixing system, generally indicated at 121, for mixing phases to prepare an emulsion generally comprises a treatment chamber, indicated at 151, that is operable to ultrasonically mix various phases to form an emulsion, and further is capable of creating a cavitation mode that allows for better mixing within the housing of the chamber 151.

It is generally believed that as ultrasonic energy is created by the waveguide assembly, increased cavitation of the phases occurs, creating microbubbles. As these microbubbles then collapse, the pressure within the chamber is increased forcibly mixing the various phases to form an emulsion.

The terms "liquid" and "emulsion" are used interchangeably to refer to a formulation comprised of two or more phases, typically one phase being a dispersed phase and one phase being a continuous phase. Furthermore, at least one of the phases is a liquid such as a liquid-liquid emulsion, a liquid-gas emulsion, or a liquid emulsion in which particulate matter is entrained, or other viscous fluids.

The ultrasonic mixing system 121 is illustrated schematically in FIG. 1 and further described herein with reference to use of the treatment chamber 151 in the ultrasonic mixing system to mix various phases to create an emulsion. The emulsion can be a cosmetic emulsion for providing one of a variety of skin benefits to a user's skin, hair, and/or body. For example, in one embodiment, the cosmetic emulsion can be an oil-in-water emulsion for cleansing the user's skin. It should be understood by one skilled in the art, however, that while described herein with respect to oil-in-water emulsions, the ultrasonic mixing system can be used to mix various phases to prepare other types of emulsions without departing from the scope of the present disclosure. For example, other suitable emulsions can include water-in-oil emulsions, water-in-oil-in-water emulsions, oil-in-water-in-oil emulsions, water-in-silicone emulsions, water-in-silicone-in-water emulsions, glycol-in-silicone emulsions, high internal phase emulsions, and the like. Still other emulsions produced using the ultrasonic treatment system of the present disclosure include hand sanitizers, anti-aging lotions, wound care serums, teeth whitening gels, animate and inanimate surface cleansers, wet wipe solutions, suntan lotions, paints, inks, coatings, and polishes for both industrial and consumer products.

In one particularly preferred embodiment, as illustrated in FIG. 1, the treatment chamber 151 is generally elongate and has a general inlet end 125 (a lower end in the orientation of the illustrated embodiment) and a general outlet end 127 (an upper end in the orientation of the illustrated embodiment). The treatment chamber 151 is configured such that at least two phases enter the treatment chamber 151 generally at the inlet end 125 thereof, flow generally longitudinally within the chamber (e.g., upward in the orientation of illustrated embodiment) and exit the chamber generally at the outlet end 127 of the chamber.

The terms "upper" and "lower" are used herein in accordance with the vertical orientation of the treatment chamber 151 illustrated in the various drawings and are not intended to describe a necessary orientation of the chamber in use. That is, while the chamber 151 is most suitably oriented vertically, with the outlet end 127 of the chamber above the inlet end 125 as illustrated in the drawing, it should be understood that the chamber may be oriented with the inlet end above the outlet end and the two phases are mixed as they travel downward through the chamber, or it may be oriented other than in a vertical orientation and remain within the scope of this disclosure. Furthermore, it s The terms "axial" and "longitudinal" refer directionally herein to the vertical direction of the chamber 151 (e.g., end-to-end such as the vertical direction in the illustrated embodiment of FIG. 1). The terms "transverse", "lateral" and "radial" refer herein to a direction normal to the axial (e.g., longitudinal) direction. The terms "inner" and "outer" are also used in reference to a direction transverse to the axial direction of the treatment chamber 151, with the term "inner" referring to a direction toward the interior of the chamber and the term "outer" referring to a direction toward the exterior of the chamber.

The inlet end 125 of the treatment chamber 151 is typically in fluid communication with at least one suitable delivery system that is operable to direct one phase to, and more suitably through, the chamber 151.

More specifically, as illustrated in FIG. 1, two delivery systems 128 and 129 are operable to direct a first phase (not shown) and a second phase (not shown) through the chamber 151. Typically, the delivery systems 128, 129 may independently comprise one or more pumps 170 and 171, respectively, operable to pump the respective phases from corresponding sources thereof to the inlet end 125 of the chamber 151 via suitable conduits 132, 134.

It is understood that the delivery systems 128, 129 may be configured to deliver more than one phase to the treatment chamber 151 without departing from the scope of this disclosure. It is also contemplated that delivery systems other than that illustrated in FIG. 1 and described herein may be used to deliver one or more phases to the inlet end 125 of the treatment chamber 151 without departing from the scope of this disclosure. It should be understood that more than one phase can refer to two streams of the same phase or different phases being delivered to the inlet end of the treatment chamber without departing from the scope of the present disclosure.

The treatment chamber 151 comprises a housing defining an interior space 153 of the chamber 151 through which at least two phases delivered to the chamber 151 flow from the inlet end 125 to the outlet end 127 thereof. The chamber housing 151 suitably comprises an elongate tube 155 generally defining, at least in part, a sidewall 157 of the chamber 151. The tube 155 may have one or more inlet ports (two inlet ports are generally indicated in FIGS. 1 at 156 and 158) formed therein through which at least two separate phases to be mixed within the chamber 151 are delivered to the interior space 153 thereof. It should be understood by one skilled in the art that the inlet end of the housing may include more than two inlet ports, more than three ports, and even more than four ports. By way of example, although not shown, the housing may comprise three inlet ports, wherein the first inlet port and the second inlet port are suitably in parallel, spaced relationship with each other, and the third inlet port is oriented on the opposite sidewall of the housing from the first and second inlet ports.

Figure 2:
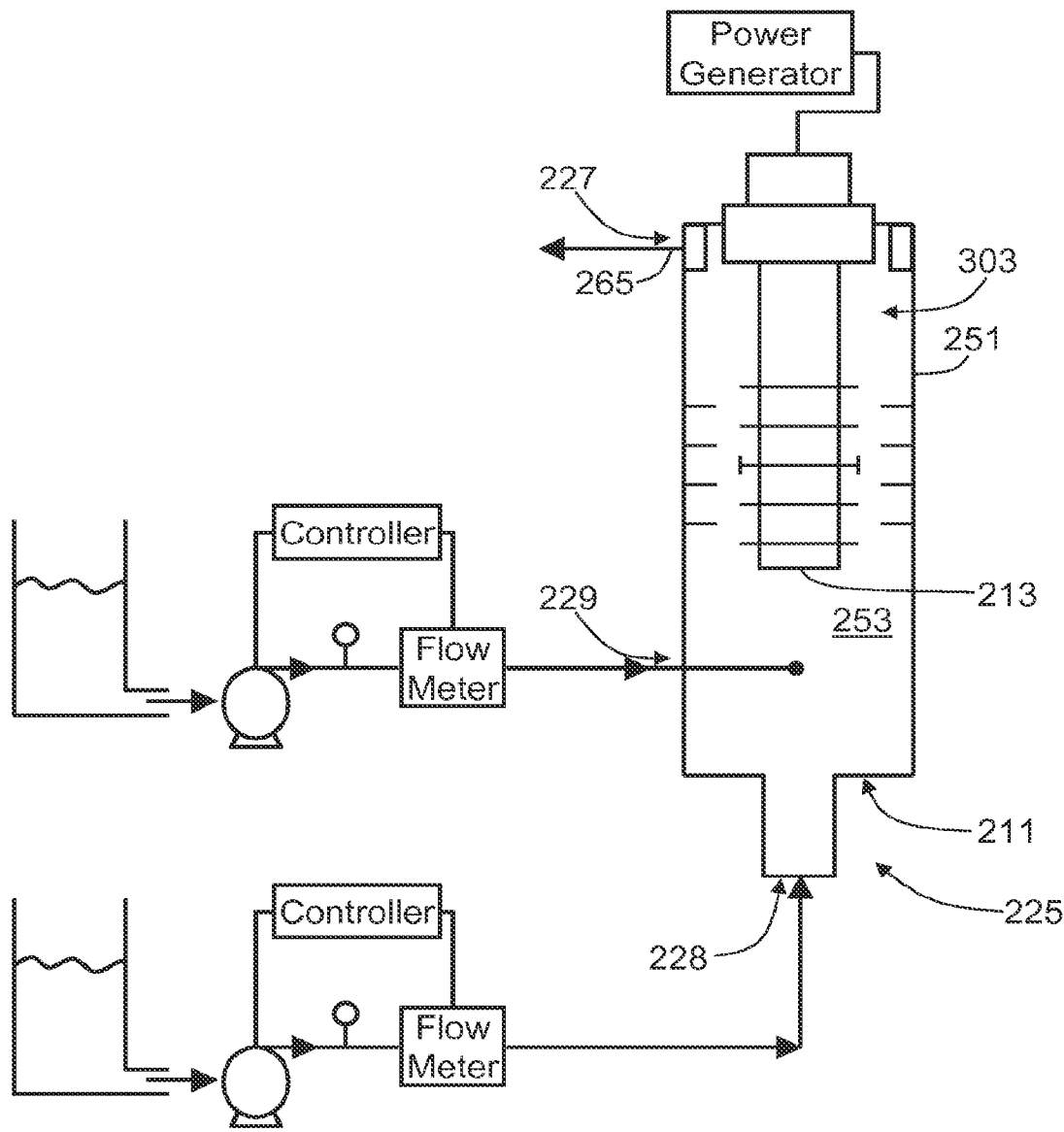
FIG. 2 is a schematic of an ultrasonic mixing system according to a second embodiment of the present disclosure for preparing an emulsion.

It should also be recognized by one skilled in the art that, while preferably the inlet ports are disposed in close proximity to one another in the inlet end, the inlet ports may be spaced farther along the sidewall of the chamber from one another (see FIG. 2) without departing from the scope of the present disclosure. Specifically, as illustrated in FIG. 2, the first inlet port 228 is disposed at the terminus of the inlet end, generally indicated at 211, and the second inlet port 229 is disposed longitudinally between the inlet end 225 and the outlet end 227. This type of configuration is beneficial when one or more of the phases to be mixed are reactive or potentially unstable due to turbulence, heat, or interaction with another phase or component. These reactive components and/or phases can be added at an alternative point (i.e., a second inlet port) located away from the first inlet port. In an alternative embodiment, the reactive component and/or phase can be added outside of the chamber such as via an in-line mixer to the prepared emulsion once the emulsion exits the chamber.

Referring back to FIG. 1, the housing 151 comprises a closure connected to and substantially closing the longitudinally opposite end of the sidewall 157, and having at least one outlet port 165 therein to generally define the outlet end 127 of the treatment chamber.

Alternatively, the housing comprises a closure connected to and substantially closing the longitudinally end of the side wall and having at least one inlet port 228 (see FIG. 2) without departing from the scope of the present disclosure. The sidewall (e.g., defined by the elongate tube) of the chamber has an inner surface that together with the waveguide assembly (as described below) and the closure define the interior space of the chamber.

In the illustrated embodiment of FIG. 1, the tube 155 is generally cylindrical so that the chamber sidewall 157 is generally annular in cross-section. However, it is contemplated that the cross-section of the chamber sidewall 157 may be other than annular, such as polygonal or another suitable shape, and remains within the scope of this disclosure. The chamber sidewall 157 of the illustrated chamber 151 is suitably constructed of a transparent material, although it is understood that any suitable material may be used as long as the material is compatible with the phases being mixed within the chamber, the pressure at which the chamber is intended to operate, and other environmental conditions within the chamber such as temperature.

A waveguide assembly, generally indicated at 203, extends longitudinally at least in part within the interior space 153 of the chamber 151 to ultrasonically energize the phases (and their resulting-emulsions) flowing through the interior space 153 of the chamber 151. In particular, the waveguide assembly 203 of the illustrated embodiment extends longitudinally from the lower or inlet end 125 of the chamber 151 up into the interior space 153 thereof to a terminal end 113 of the waveguide assembly disposed intermediate the inlet port (e.g., inlet port 156 where it is present) and outlet port (e.g., outlet port 165 where it is present). Although illustrated in FIG. 1 as extending longitudinally from the inlet end into the interior space 153 of the chamber 151, it should be understood by one skilled in the art that the waveguide assembly may extend longitudinally from the outlet end downward into the interior space (see FIG. 2); that is the waveguide assembly may be inverted within the chamber housing without departing from the scope of the present disclosure. Additionally, the waveguide assembly may extend laterally from a housing sidewall of the chamber, running horizontally through the interior space thereof without departing from the scope of the present disclosure. Typically, the waveguide assembly 203 is mounted, either directly or indirectly, to the chamber housing 151 as will be described later herein.

Still referring to FIG. 1, the waveguide assembly 203 suitably comprises an elongate horn assembly, generally indicated at 133, disposed entirely with the interior space 153 of the housing 151 intermediate the inlet ports 156, 158 and the outlet port 165 for complete submersion within the liquid being treated within the chamber 151, and more suitably, in the illustrated embodiment, it is aligned coaxially with the chamber sidewall 157. The horn assembly 133 has an outer surface 107 that together with an inner surface 167 of the sidewall 157 defines a flow path within the interior space 153 of the chamber 151 along which the two or more phases (and the resulting-emulsion) flow past the horn within the chamber (this portion of the flow path being broadly referred to herein as the ultrasonic treatment zone). The horn assembly 133 has an upper end defining a terminal end of the horn assembly (and therefore the terminal end 113 of the waveguide assembly) and a longitudinally opposite lower end 111. Although not shown, it is particularly preferable that the waveguide assembly 203 also comprises a booster coaxially aligned with and connected at an upper end thereof to the lower end 111 of the horn assembly 133. It is understood, however, that the waveguide assembly 203 may comprise only the horn assembly 133 and remain within the scope of this disclosure. It is also contemplated that the booster may be disposed entirely exterior of the chamber housing 151, with the horn assembly 133 mounted on the chamber housing 151 without departing from the scope of this disclosure.

The waveguide assembly 203, and more particularly the booster is suitably mounted on the chamber housing 151, e.g., on the tube 155 defining the chamber sidewall 157, at the upper end thereof by a mounting member (not shown) that is configured to vibrationally isolate the waveguide assembly (which vibrates ultrasonically during operation thereof) from the treatment chamber housing. That is, the mounting member inhibits the transfer of longitudinal and transverse mechanical vibration of the waveguide assembly 203 to the chamber housing 151 while maintaining the desired transverse position of the waveguide assembly (and in particular the horn assembly 133) within the interior space 153 of the chamber housing and allowing both longitudinal and transverse displacement of the horn assembly within the chamber housing. The mounting member also at least in part (e.g., along with the booster, lower end of the horn assembly) closes the inlet end 125 of the chamber 151. Examples of suitable mounting member configurations are illustrated and described in U.S. Pat. No. 6,676,003, the entire disclosure of which is incorporated herein by reference to the extent it is consistent herewith.

In one particularly suitable embodiment the mounting member is of single piece construction. Even more suitably the mounting member may be formed integrally with the booster (and more broadly with the waveguide assembly 203). However, it is understood that the mounting member may be constructed separately from the waveguide assembly 203 and remain within the scope of this disclosure. It is also understood that one or more components of the mounting member may be separately constructed and suitably connected or otherwise assembled together.

In one suitable embodiment, the mounting member is further constructed to be generally rigid (e.g., resistant to static displacement under load) so as to hold the waveguide assembly 203 in proper alignment within the interior space 153 of the chamber 151. For example, the rigid mounting member in one embodiment may be constructed of a non-elastomeric material, more suitably metal, and even more suitably the same metal from which the booster (and more broadly the waveguide assembly 203) is constructed. The term "rigid" is not, however, intended to mean that the mounting member is incapable of dynamic flexing and/or bending in response to ultrasonic vibration of the waveguide assembly 203. In other embodiments, the rigid mounting member may be constructed of an elastomeric material that is sufficiently resistant to static displacement under load but is otherwise capable of dynamic flexing and/or bending in response to ultrasonic vibration of the waveguide assembly 203.

A suitable ultrasonic drive system 131 including at least an exciter (not shown) and a power source (not shown) is disposed exterior of the chamber 151 and operatively connected to the booster (not shown) (and more broadly to the waveguide assembly 203) to energize the waveguide assembly to mechanically vibrate ultrasonically. Examples of suitable ultrasonic drive systems 131 include a Model 20A3000 system available from Dukane Ultrasonics of St. Charles, Ill., and a Model 2000CS system available from Herrmann Ultrasonics of Schaumburg, Ill.

In one embodiment, the drive system 131 is capable of operating the waveguide assembly 203 at a frequency in the range of about 15 kHz to about 100 kHz, more suitably in the range of about 15 kHz to about 60 kHz, and even more suitably in the range of about 20 kHz to about 40 kHz. Such ultrasonic drive systems 131 are well known to those skilled in the art and need not be further described herein.

In some embodiments, however not illustrated, the treatment chamber can include more than one waveguide assembly having at least two horn assemblies for ultrasonically treating and mixing the phases together to prepare the emulsion. As noted above, the treatment chamber comprises a housing defining an interior space of the chamber through which the phases are delivered from an inlet end. The housing comprises an elongate tube defining, at least in part, a sidewall of the chamber. As with the embodiment including only one waveguide assembly as described above, the tube may have more than two inlet ports formed therein, through which at least two phases to be mixed within the chamber are delivered to the interior space thereof, and at least one outlet port through which the emulsion exits the chamber.

In such an embodiment, two or more waveguide assemblies extend longitudinally at least in part within the interior space of the chamber to ultrasonically energize and mix the phases (and resulting-emulsion) flowing through the interior space of the chamber. Each waveguide assembly separately includes an elongate horn assembly, each disposed entirely within the interior space of the housing intermediate the inlet ports and the outlet port for complete submersion within the phases being mixed within the chamber. Each horn assembly can be independently constructed as described more fully herein (including the horns, along with the plurality of agitating members and baffle assemblies).

Referring back to FIG. 1, the horn assembly 133 comprises an elongate, generally cylindrical horn 105 having an outer surface 107, and two or more (i.e., a plurality of) agitating members 137 connected to the horn and extending at least in part transversely outward from the outer surface of the horn in longitudinally spaced relationship with each other. The horn 105 is suitably sized to have a length equal to about one-half of the resonating wavelength (otherwise commonly referred to as one-half wavelength) of the horn. In one particular embodiment, the horn 105 is suitably configured to resonate in the ultrasonic frequency ranges recited previously, and most suitably at 20 kHz. For example, the horn 105 may be suitably constructed of a titanium alloy (e.g., $Ti_6Al_4V$) and sized to resonate at 20 kHz. The one-half wavelength horn 105 operating at such frequencies thus has a length (corresponding to a one-half wavelength) in the range of about 4 inches to about 6 inches, more suitably in the range of about 4.5 inches to about 5.5 inches, even more suitably in the range of about 5.0 inches to about 5.5 inches, and most suitably a length of about 5.25 inches (133.4 mm). It is understood, however, that the treatment chamber 151 may include a horn 105 sized to have any increment of one-half wavelength without departing from the scope of this disclosure.

In one embodiment (not shown), the agitating members 137 comprise a series of five washer-shaped rings that extend continuously about the circumference of the horn in longitudinally spaced relationship with each other and transversely outward from the outer surface of the horn. In this manner the vibrational displacement of each of the agitating members relative to the horn is relatively uniform about the circumference of the horn. It is understood, however, that the agitating members need not each be continuous about the circumference of the horn. For example, the agitating members may instead be in the form of spokes, blades, fins or other discrete structural members that extend transversely outward from the outer surface of the horn. For example, as illustrated in FIG. 1, one of the five agitating members is in a T-shape 701. Specifically, the T-shaped agitating member 701 surrounds the nodal region. It has been found that members in the T-shape, generate a strong radial (e.g., horizontal) acoustic wave that further increases the cavitation effect as described more fully herein.

By way of a dimensional example, the horn assembly 133 of the illustrated embodiment of FIG. 1 has a length of about 5.25 inches (133.4 mm), one of the rings 137 is suitably disposed adjacent the terminal end 113 of the horn 105 (and hence of the waveguide assembly 203), and more suitably is longitudinally spaced approximately 0.063 inches (1.6 mm) from the terminal end of the horn 105. In other embodiments the uppermost ring may be disposed at the terminal end of the horn 105 and remain within the scope of this disclosure. The rings 137 are each about 0.125 inches (3.2 mm) in thickness and are longitudinally spaced from each other (between facing surfaces of the rings) a distance of about 0.875 inches (22.2 mm).

It is understood that the number of agitating members 137 (e.g., the rings in the illustrated embodiment) may be less than or more than five without departing from the scope of this disclosure. It is also understood that the longitudinal spacing between the agitating members 137 may be other than as illustrated in FIG. 1 and described above (e.g., either closer or spaced further apart). Furthermore, while the rings 137 illustrated in FIG. 1 are equally longitudinally spaced from each other, it is alternatively contemplated that where more than two agitating members are present the spacing between longitudinally consecutive agitating members need not be uniform to remain within the scope of this disclosure.

In particular, the locations of the agitating members 137 are at least in part a function of the intended vibratory displacement of the agitating members upon vibration of the horn assembly 133. For example, in the illustrated embodiment of FIG. 1, the horn assembly 133 has a nodal region located generally longitudinally centrally of the horn 105 (e.g., at the third ring). As used herein and more particularly shown in FIG. 1, the "nodal region" of the horn 105 refers to a longitudinal region or segment of the horn member along which little (or no) longitudinal displacement occurs during ultrasonic vibration of the horn and transverse (e.g., radial in the illustrated embodiment) displacement of the horn is generally maximized. Transverse displacement of the horn assembly 133 suitably comprises transverse expansion of the horn but may also include transverse movement (e.g., bending) of the horn.

In the illustrated embodiment of FIG. 1, the configuration of the one-half wavelength horn 105 is such that the nodal region is particularly defined by a nodal plane (i.e., a plane transverse to the horn member at which no longitudinal displacement occurs while transverse displacement is generally maximized) is present. This plane is also sometimes referred to as a "nodal point". Accordingly, agitating members 137 (e.g., in the illustrated embodiment, the rings) that are disposed longitudinally further from the nodal region of the horn 105 will experience primarily longitudinal displacement while agitating members that are longitudinally nearer to the nodal region will experience an increased amount of transverse displacement and a decreased amount of longitudinal displacement relative to the longitudinally distal agitating members.

It is understood that the horn 105 may be configured so that the nodal region is other than centrally located longitudinally on the horn member without departing from the scope of this disclosure. It is also understood that one or more of the agitating members 137 may be longitudinally located on the horn so as to experience both longitudinal and transverse displacement relative to the horn upon ultrasonic vibration of the horn 105.

Still referring to FIG. 1, the agitating members 137 are sufficiently constructed (e.g., in material and/or dimension such as thickness and transverse length, which is the distance that the agitating member extends transversely outward from the outer surface 107 of the horn 105) to facilitate dynamic motion, and in particular dynamic flexing/bending of the agitating members in response to the ultrasonic vibration of the horn. In one particularly suitable embodiment, for a given ultrasonic frequency at which the waveguide assembly 203 is to be operated in the treatment chamber (otherwise referred to herein as the predetermined frequency of the waveguide assembly) and a particular liquid to be treated within the chamber 151, the agitating members 137 and horn 105 are suitably constructed and arranged to operate the agitating members in what is referred to herein as an ultrasonic cavitation mode at the predetermined frequency.

As used herein, the ultrasonic cavitation mode of the agitating members refers to the vibrational displacement of the agitating members sufficient to result in cavitation (i.e., the formation, growth, and implosive collapse of bubbles in a liquid) of the emulsion being prepared at the predetermined ultrasonic frequency. For example, where at least one of the phases for the emulsion flowing within the chamber comprises an aqueous phase, and the ultrasonic frequency at which the waveguide assembly 203 is to be operated (i.e., the predetermined frequency) is about 20 kHZ, one or more of the agitating members 137 are suitably constructed to provide a vibrational displacement of at least 1.75 mils (i.e., 0.00175 inches, or 0.044 mm) to establish a cavitation mode of the agitating members. Similarly, when at least one of the phases for the emulsion is a hydrophobic phase (e.g., oil), and the ultrasonic frequency is about 20 kHz, one or more of the agitating members 137 are suitable constructed to provide a vibrational displacement of at least 1.75 mils. To establish a cavitation mode of the agitating members.

It is understood that the waveguide assembly 203 may be configured differently (e.g., in material, size, etc.) to achieve a desired cavitation mode associated with the particular emulsion to be prepare. For example, as the viscosity of the phases being mixed to prepare the emulsion changes, the cavitation mode of the agitating members may need to be changed.

In particularly suitable embodiments, the cavitation mode of the agitating members corresponds to a resonant mode of the agitating members whereby vibrational displacement of the agitating members is amplified relative to the displacement of the horn. However, it is understood that cavitation may occur without the agitating members operating in their resonant mode, or even at a vibrational displacement that is greater than the displacement of the horn, without departing from the scope of this disclosure.

In one suitable embodiment, a ratio of the transverse length of at least one and, more suitably, all of the agitating members to the thickness of the agitating member is in the range of about 2:1 to about 6:1. As another example, the rings each extend transversely outward from the outer surface 107 of the horn 105 a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members may be other than that of the rings as described above without departing from the scope of this disclosure. Also, while the agitating members 137 (rings) may suitably each have the same transverse length and thickness, it is understood that the agitating members may have different thicknesses and/or transverse lengths.

In the above described embodiment, the transverse length of the agitating member also at least in part defines the size (and at least in part the direction) of the flow path along which the phases or other flowable components in the interior space of the chamber flows past the horn. For example, the horn may have a radius of about 0.875 inches (22.2 mm) and the transverse length of each ring is, as discussed above, about 0.5 inches (12.7 mm). The radius of the inner surface of the housing sidewall is approximately 1.75 inches (44.5 mm) so that the transverse spacing between each ring and the inner surface of the housing sidewall is about 0.375 inches (9.5 mm). It is contemplated that the spacing between the horn outer surface and the inner surface of the chamber sidewall and/or between the agitating members and the inner surface of the chamber sidewall may be greater or less than described above without departing from the scope of this disclosure.

In general, the horn 105 may be constructed of a metal having suitable acoustical and mechanical properties. Examples of suitable metals for construction of the horn 105 include, without limitation, aluminum, monel, titanium, stainless steel, and some alloy steels. It is also contemplated that all or part of the horn 105 may be coated with another metal such as silver, platinum, gold, palladium, lead dioxide, and copper to mention a few. In one particularly suitable embodiment, the agitating members 137 are constructed of the same material as the horn 105, and are more suitably formed integrally with the horn. In other embodiments, one or more of the agitating members 137 may instead be formed separate from the horn 105 and connected thereto.

While the agitating members 137 (e.g., the rings) illustrated in FIG. 1 are relatively flat, i.e., relatively rectangular in cross-section, it is understood that the rings may have a cross-section that is other than rectangular without departing from the scope of this disclosure. The term "cross-section" is used in this instance to refer to a cross-section taken along one transverse direction (e.g., radially in the illustrated embodiment) relative to the horn outer surface 107). Additionally, as seen of the first two and last two agitating members 137 (e.g., the rings) illustrated in FIG. 1 are constructed only to have a transverse component, it is contemplated that one or more of the agitating members may have at least one longitudinal (e.g., axial) component to take advantage of transverse vibrational displacement of the horn (e.g., at the third agitating member as illustrated in FIG. 1) during ultrasonic vibration of the waveguide assembly 203.

As best illustrated in FIG. 1, the terminal end 113 of the waveguide assembly (e.g., of the horn 105 in the illustrated embodiment) is suitably spaced longitudinally from the outlet port 165 at the outlet end 127 in FIG. 1 to define what is referred to herein as a buffer zone (i.e., the portion of the interior space 153 of the chamber housing 151 longitudinally beyond the terminal end 113 of the waveguide assembly 203) to allow more uniform mixing of components as the phases (and resulting-emulsion) flow downstream of the terminal end 112 to the outlet end 127 of the chamber 151. For example, in one suitable embodiment, the buffer zone has a void volume (i.e., the volume of that portion of the open space 153 within the chamber housing 151 within the buffer zone) in which the ratio of this buffer zone void volume to the void volume of the remainder of the chamber housing interior space upstream of the terminal end of the waveguide assembly is suitably in the range of from about 0.01:1 to about 5.0:1, and more suitably about 1:1.

Providing the illustrated buffer zone is particularly suitable where the chamber 151 is used for mixing phases together to form an emulsion as the longitudinal spacing between the terminal end 113 of the waveguide assembly 203 and the outlet port 165 of the chamber 151 provides sufficient space for the agitated flow of the mixed emulsion to generally settle prior to the emulsion exiting the chamber via the outlet port 127. This is particularly useful where, as in the illustrated embodiment, one of the agitating members 137 is disposed at or adjacent the terminal end of the horn 113. While such an arrangement leads to beneficial back-mixing of the emulsion as it flows past the terminal end of the horn 113, it is desirable that this agitated flow settle out at least in part before exiting the chamber. It is understood, though, that the terminal end 113 of the horn 105 may be nearer to the outlet end 127 than is illustrated in FIG. 1, and may be substantially adjacent to the outlet port 165 so as to generally omit the buffer zone, without departing from the scope of this disclosure.

Additionally, a baffle assembly, generally indicated at 245 is disposed within the interior space 153 of the chamber housing 151, and in particular generally transversely adjacent the inner surface 167 of the sidewall 157 and in generally transversely opposed relationship with the horn 105. In one suitable embodiment, the baffle assembly 245 comprises one or more baffle members 247 disposed adjacent the inner surface 167 of the housing sidewall 157 and extending at least in part transversely inward from the inner surface of the sidewall 167 toward the horn 105. More suitably, the one or more baffle members 247 extend transversely inward from the housing sidewall inner surface 167 to a position longitudinally intersticed with the agitating members 137 that extend outward from the outer surface 107 of the horn 105. The term "longitudinally intersticed" is used herein to mean that a longitudinal line drawn parallel to the longitudinal axis of the horn 105 passes through both the agitating members 137 and the baffle members 247. As one example, in the illustrated embodiment, the baffle assembly 245 comprises four, generally annular baffle members 247 (i.e., extending continuously about the horn 105) longitudinally intersticed with the five agitating members 237.

As a more particular example, the four annular baffle members 247 illustrated in FIG. 1 are of the same thickness as the agitating members 137 in our previous dimensional example (i.e., 0.125 inches (3.2 mm)) and are spaced longitudinally from each other (e.g., between opposed faces of consecutive baffle members) equal to the longitudinal spacing between the rings (i.e., 0.875 inches (22.2 mm)). Each of the annular baffle members 247 has a transverse length (e.g., inward of the inner surface 167 of the housing sidewall 157) of about 0.5 inches (12.7 mm) so that the innermost edges of the baffle members extend transversely inward beyond the outermost edges of the agitating members 137 (e.g., the rings). It is understood, however, that the baffle members 247 need not extend transversely inward beyond the outermost edges of the agitating members 137 of the horn 105 to remain within the scope of this disclosure.

It will be appreciated that the baffle members 247 thus extend into the flow path of the phases (and resulting-emulsion) that flow within the interior space 153 of the chamber 151 past the horn 105 (e.g., within the ultrasonic treatment zone). As such, the baffle members 247 inhibit the phases from flowing along the inner surface 167 of the chamber sidewall 157 past the horn 105, and more suitably the baffle members facilitate the flow of the phases transversely inward toward the horn for flowing over the agitating members of the horn to thereby facilitate ultrasonic energization (i.e., agitation) of the phases to initiate mixing of the phases to form an emulsion.

In one embodiment, to inhibit gas bubbles against stagnating or otherwise building up along the inner surface 167 of the sidewall 157 and across the face on the underside of each baffle member 247, e.g., as a result of agitation of the phases within the chamber, a series of notches (broadly openings) may be formed in the outer edge of each of the baffle members (not shown) to facilitate the flow of gas (e.g., gas bubbles) between the outer edges of the baffle members and the inner surface of the chamber sidewall. For example, in one particularly preferred embodiment, four such notches are formed in the outer edge of each of the baffle members in equally spaced relationship with each other. It is understood that openings may be formed in the baffle members other than at the outer edges where the baffle members abut the housing, and remain within the scope of this disclosure. It is also understood, that these notches may number more or less than four, as discussed above, and may even be completely omitted.

It is further contemplated that the baffle members 247 need not be annular or otherwise extend continuously about the horn 105. For example, the baffle members 247 may extend discontinuously about the horn 105, such as in the form of spokes, bumps, segments or other discrete structural formations that extend transversely inward from adjacent the inner surface 167 of the housing sidewall 157. The term "continuously" in reference to the baffle members 247 extending continuously about the horn does not exclude a baffle member as being two or more arcuate segments arranged in end-to-end abutting relationship, i.e., as long as no significant gap is formed between such segments. Suitable baffle member configurations are disclosed in U.S. application Ser. No. 11/530, 311 (filed Sep. 8, 2006), which is hereby incorporated by reference to the extent it is consistent herewith.

Also, while the baffle members 247 illustrated in FIG. 1 are each generally flat, e.g., having a generally thin rectangular cross-section, it is contemplated that one or more of the baffle members may each be other than generally flat or rectangular in cross-section to further facilitate the flow of bubbles along the interior space 153 of the chamber 151. The term "cross-section" is used in this instance to refer to a cross-section taken along one transverse direction (e.g., radially in the illustrated embodiment, relative to the horn outer surface 107).

As described above, in some embodiments, the waveguide assembly may be inverted within the chamber. Specifically, as shown in FIG. 2, the waveguide assembly 303 is mounted to the chamber housing 251 at the outlet end 227 and extends longitudinally downward within the interior space 253 of the chamber housing 251. The first and second phases (not shown) enter the chamber 251 through inlet ports 228 and 229 and travel longitudinally upward towards the terminal end of the horn 213 (and, as illustrated, the terminal end of the waveguide assembly) where the phases are ultrasonically energized and mixed to form an emulsion. Once mixed, the emulsion travels to the outlet end 227 of the chamber 251 and exits the chamber 251 through the outlet port 265.

In one embodiment, although not illustrated, the ultrasonic mixing system may further comprise a filter assembly disposed at the outlet end of the treatment chamber. Many emulsions, when initially prepared, can contain one or more components within the various phases that attract one another and can clump together in large balls. Furthermore, many times, particles within the prepared emulsions can settle out over time and attract one another to form large balls; referred to as reagglomeration. As such, the filter assembly can filter out the large balls of particles that form within the emulsions prior to the emulsion being delivered to an end-product for consumer use. Specifically, the filter assembly is constructed to filter out particles sized greater than about 0.2 microns.

Specifically, in one particularly preferred embodiment, the filter assembly covers the inner surface of the outlet port. The filter assembly includes a filter having a pore size of from about 0.5 micron to about 20 microns. More suitably, the filter assembly includes a filter having a pore size of from about 1 micron to about 5 microns, and even more suitably, about 2 microns. The number and pour size of filters for use in the filter assembly will typically depend on the formulation (and its components) to be mixed within the treatment chamber.

A degasser may also be included in the ultrasonic mixing system. For example, once the prepared emulsion exits the treatment chamber, the emulsion flows into a degasser in which excess gas bubbles are removed from the emulsion prior to the emulsion being used into a consumer end-products, such as a cosmetic formulation.

One particularly preferred degasser is a continuous flow gas-liquid cyclone separator, such as commercially available from NATCO (Houston, Tex.). It should be understood by a skilled artisan, however, that any other system that separates gas from an emulsion by centrifugal action can suitably be used without departing from the present disclosure.

In operation according to one embodiment of the ultrasonic mixing system of the present disclosure, the mixing system (more specifically, the treatment chamber) is used to mix two or more phases together to form an emulsion. Specifically, at least a first phase is delivered (e.g., by the pumps described above) via conduits to a first inlet port formed in the treatment chamber housing and a second phase is delivered (e.g., by the pumps described above) via separate conduits to a second inlet port formed in the treatment chamber housing. The phases can be any suitable phases for forming emulsions known in the art. Suitable phases can include, for example, an oil phase, a water phase, a silicone phase, a glycol phase, and combinations thereof. When mixed in various combinations, the phases form emulsions such as oil-in-water emulsions, water-in-oil emulsions, water-in-oil-in-water emulsions, oil-in-water-in-oil emulsions, water-in-silicone emulsions, water-in-silicone-in-water emulsions, glycol-in-silicone emulsion, high internal phase emulsions, hydrogels, and the like. High internal phase emulsions are well known in the art and typically refer to emulsions having from about 70% (by total weight emulsion) to about 80% (by total weight emulsion) of an oil phase. Furthermore, as known by one skilled in the art, "hydrogel" typically refers to a hydrophilic base that is thickened with rheology modifiers and or thickeners to form a gel. For example a hydrogel can be formed with a base consisting of water that is thickened with a carbomer that has been neutralized with a base.

Without being limited, the present disclosure will describe a method of preparing an oil-in-water emulsion using the ultrasonic mixing system as described herein. It should be recognized that while described in terms of preparing an oil-in-water emulsion, any of the above-listed emulsions may be prepared using the general process described without departing from the scope of the present disclosure. Generally, the method for preparing the oil-in-water emulsion includes: delivering a first phase (i.e., an oil phase) via a first inlet port into the interior space of the treatment chamber housing and a second phase (i.e., a water phase) via a second inlet port into the interior space of the treatment chamber housing. Typically, as described more fully above, the first and second inlet ports are disposed in parallel along the sidewall of the treatment chamber housing. In an alternative embodiment, the first and second inlet ports are disposed on opposite sidewalls of the treatment chamber housing. While described herein as having two inlet ports, it should be understood by one skilled in the art that more than two inlet ports can be used to deliver the various phases to be mixed without departing from the scope of the present disclosure.

Particularly preferred oil-in-water emulsions can be prepared with an oil phase including from about 0.1% (by total weight of oil phase) to about 99% (by total weight of oil phase) oil. More suitably, the oil phase includes from about 1% (by total weight of oil phase) to about 80% (by total weight of oil phase) oil and, even more suitably, from about 5% (by total weight of oil phase) to about 50% (by total weight of oil phase) oil. The oils can be natural oil, synthetic oils, and combinations thereof.

The term "natural oil" is intended to include oils, essential oils, and combinations thereof.

Suitable oils include Apricot Kernel Oil, Avocado Oil, Babassu Oil, Borage Seed Oil, Camellia Oil, Canola Oil, Carrot Oil, Cashew Nut Oil, Castor Oil, Chemy Pit Oil, Chia Oil, Coconut Oil, Cod Liver Oil, Corn Germ Oil, Corn Oil, Cottonseed Oil, Egg Oil, Epoxidized Soybean Oil, Evening Primrose Oil, Grape Seed Oil, Hazelnut Oil, Hybrid Safflower Oil, Hybrid Sunflower Seed Oil, Hydrogenated Castor Oil, Hydrogenated Castor Oil Laurate, Hydrogenated Coconut Oil, Hydrogenated Cottonseed Oil, Hydrogenated Fish Oil, Hydrogenated Menhaden Oil, Hydrogenated Mink Oil, Hydrogenated Orange Roughy Oil, Hydrogenated Palm Kernel Oil, Hydrogenated Palm Oil, Hydrogenated Peanut Oil, Hydrogenated Shark Liver Oil, Hydrogenated Soybean Oil, Hydrogenated Vegetable Oil, Lanolin and Lanolin Derivatives, Lesquerella Oil, Linseed Oil, Macadamia Nut Oil, Maleated Soybean Oil, Meadowfoam Seed Oil, Menhaden Oil, Mink Oil, Moring a Oil, Mortierella Oil, Neatsfoot Oil, Olive Husk Oil, Olive Oil, Orange Roughy Oil, Palm Kernel Oil, Palm Oil, Peach Kernel Oil, Peanut Oil, Pengawar Djambi Oil, Pistachio Nut Oil, Rapeseed Oil, Rice Bran Oil, Safflower Oil, Sesame Oil, Shark Liver Oil, Soybean Oil, Sunflower Seed Oil, Sweet Almond Oil, Tall Oil, Vegetable Oil, Walnut Oil, Wheat Bran Lipids, Wheat Germ Oil, Zadoary Oil, oil extracts of various other botanicals, and other vegetable or partially hydrogenated vegetable oils, and the like, as well as mixtures thereof.

Suitable essential oils include Anise Oil, Balm Mint Oil, Basil Oil, Bee Balm Oil, Bergamot Oil, Birch Oil, Bitter Almond Oil, Bitter Orange Oil, Calendula Oil, California Nutmeg Oil, Caraway Oil, Cardamom Oil, Chamomile Oil, Cinnamon Oil, Clary Oil, Cloveleaf Oil, Clove Oil, Coriander Oil, Cypress Oil, Eucalyptus Oil, Fennel Oil, Gardenia Oil, Geranium Oil, Ginger Oil, Grapefruit Oil, Hops Oil, Hyptis Oil, Indigo Bush Oil, Jasmine Oil, Juniper Oil, Kiwi Oil, Laurel Oil, Lavender Oil, Lemongrass Oil, Lemon Oil, Linden Oil, Lovage Oil, Mandarin Orange Oil, Matricaria Oil, Musk Rose Oil, Nutmeg Oil, Olibanum, Orange Flower Oil, Orange Oil, Patchouli Oil, Pennyroyal Oil, Peppermint Oil, Pine Oil, Pine Tar Oil, Rose Hips Oil, Rosemary Oil, Rose Oil, Rue Oil, Sage Oil, Sambucus Oil, Sandalwood Oil, Sassafras Oil, Silver Fir Oil, Spearmint Oil, Sweet Marjoram Oil, Sweet Violet Oil, Tar Oil, Tea Tree Oil, Thyme Oil, Wild Mint Oil, Yarrow Oil, Ylang Ylang Oil, and the like, as well as mixtures thereof.

Some preferred natural oils include, but are not limited to Avocado Oil, Apricot Oil, Babassu Oil, Borage Oil, Camellia oil, Canola oil, Castor Oil, Coconut oil, Corn Oil, Cottonseed Oil, Evening Primrose Oil, Hydrogenated Cottonseed Oil, Hydrogenated Palm Kernel Oil, Maleated Soybean Oil, Meadowfoam Oil, Palm Kernel Oil, Phospholipids, Rapeseed Oil, Rose Hip Oil, Sunflower Oil, Soybean Oil, and the like, as well as mixtures thereof.

The term "synthetic oil" is intended to include synthetic oils, esters, silicones, other emollients, and combinations thereof. Examples of suitable synthetic oils include petrolatum and petrolatum based oils, mineral oils, mineral jelly, isoparaffins, polydimethylsiloxanes such as methicone, cyclomethicone, dimethicone, dimethiconol, trimethicone, alkyl dimethicones, alkyl methicones, alkyldimethicone copolyols, organo-siloxanes (i.e., where the organic functionality can be selected from alkyl, phenyl, amine, polyethylene glycol, amine-glycol, alkylaryl, carboxal, and the like), silicones such as silicone elastomer, phenyl silicones, alkyl trimethylsilanes, dimethicone crosspolymers, cyclomethicone, gums, resins, fatty acid esters (esters of $C_6$-$C_{28}$ fatty acids and $C_6$-$C_{28}$ fatty alcohols), glyceryl esters and derivatives, fatty acid ester ethoxylates, alkyl ethoxylates, $C_{12}$-$C_{28}$ fatty alcohols, $C_{12}$-$C_{28}$ fatty acids, $C_{12}$-$C_{28}$ fatty alcohol ethers, propylene glycol esters and derivatives, alkoxylated carboxylic acids, alkoxylated alcohols, fatty alcohols, Guerbet alcohols, Guerbet Acids, Guerbet Esters, and other cosmetically acceptable emollients.

Specific examples of suitable esters may include, but are not limited to, cetyl palmitate, stearyl palmitate, cetyl stearate, isopropyl laurate, isopropyl myristate, isopropyl palmitate, and combinations thereof.

In addition to the oil, the oil phase of the oil-in-water emulsion may further include one or more surfactants and/or antioxidants. It should be recognized, however, that the oil phase may not contain a surfactant/antioxidant without departing from the scope of the present disclosure. Furthermore, due to the cavitation produced with the ultrasonic treatment system, when surfactants are used, less surfactant needs to be added. While described herein in the oil phase, it should be recognized by one skilled in the art, that one or more surfactants can be added to the water phase in addition to or as an alternative to being added to the oil phase without departing from the scope of the present disclosure.

As noted above, emulsions are typically prepared using surfactants as the surfactants may contribute to the overall cleansing, emulsification properties of the emulsion. Additionally, the surfaces may be utilized to provide emulsions that are mild to the skin and have a low likelihood of stripping essential oils from the user, thereby creating irritation. Preferably, the oil phase contains from about 0.1% (by total weight oil phase) to about 20% (by total weight oil phase) surfactant. More suitably, the oil phase contains from about 1% (by total weight oil phase) to about 15% (by total weight oil phase) surfactant and, even more suitably, from about 2% (by total weight oil phase) to about 10% (by total weight oil phase) surfactant.

Suitable surfactants can be nonionic surfactants, anionic surfactants, cationic surfactants, amphoteric surfactants, and combinations thereof. Suitable anionic surfactants include, for example, alkyl sulfates, alkyl ether sulfates, alkyl aryl sulfonates, alpha-olefin sulfonates, alkali metal or ammonium salts of alkyl sulfates, alkali metal or ammonium salts of alkyl ether sulfates, alkyl phosphates, silicone phosphates, alkyl glyceryl sulfonates, alkyl sulfosuccinates, alkyl taurates, acyl taurates, alkyl sarcosinates, acyl sarcosinates, sulfoacetates, alkyl phosphate esters, mono alkyl succinates, monoalkyl maleates, sulphoacetates, acyl isethionates, alkyl carboxylates, phosphate esters, sulphosuccinates (e.g., sodium dioctylsulphosuccinate), and combinations thereof. Specific examples of anionic surfactants include sodium lauryl sulphate, sodium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauroyl isethionate, sodium N-lauryl sarcosinate, and combinations thereof.

Suitable cationic surfactants include, for example, alkyl ammonium salts, polymeric ammonium salts, alkyl pyridinium salts, aryl ammonium salts, alkyl aryl ammonium salts, silicone quaternary ammonium compounds, and combinations thereof. Specific examples of cationic surfactants include behenyltrimonium chloride, stearlkonium chloride, distearalkonium chloride, chlorohexidine diglutamate, polyhexamethylene biguanide (PHMB), cetyl pyridinium chloride, benzammonium chloride, benzalkonium chloride, and combinations thereof.

Suitable amphoteric surfactants include, for example, betaines, alkylamido betaines, sulfobetaines, N-alkyl betaines, sultaines, amphoacetates, amophodiacetates, imidazoline carboxylates, sarcosinates, acylamphoglycinates, such as cocamphocarboxyglycinates and acylamphopropionates, and combinations thereof. Specific examples of amphoteric surfactants include cocamidopropyl betaine, lauramidopropyl betaine, meadowfoamamidopropyl betaine, sodium cocoyl sarcosinate, sodium cocamphoacetate, disodium cocoamphodiacetate, ammonium cocoyl sarcosinate, sodium cocoamphopropionate, and combinations thereof.

Suitable zwitterionic surfactants include, for example, alkyl amine oxides, silicone amine oxides, and combinations thereof. Specific examples of suitable zwitterionic surfactants include, for example, 4-[N,N-di(2-hydroxyethyl)-N-octadecylammonio]-butane-1-carboxylate, S—[S-3-hydroxypropyl-5-hexadecylsulfonio]-3-hydroxypentane-1-sulfate, 3-[P,P-diethyl-P-3,6,9-trioxatetradexopcylphosphonio]-2-hydroxypropane-1-phosphate, 3-[N,N-dipropyl-N-3-dodecoxy-2-hydroxypropylammonio]-propane-1-phosphonate, 3-(N,N-dimethyl-N-hexadecylammonio)propane-1-sulfonate, 3-(N,N-dimethyl-N-hexadecylammonio)-2-hydroxypropane-1-sulfonate, 4-[N,N-di(2-hydroxyethyl)-N-(2-hydroxydodecyl)ammonio]-butane-1-carboxylate, 3-[S-ethyl-S-(3-dodecoxy-2-hydroxypropyl)sulfonio]-propane-1-phosphate, 3-[P,P-dimethyl-P-dodecylphosphonio]-propane-1-phosphonate, 5-[N,N-di(3-hydroxypropyl)-N-hexadecylammonio]-2-hydroxy-pentane-1-sulfate, and combinations thereof.

Suitable non-ionic surfactants include, for example, mono- and di-alkanolamides such as, for example, cocamide MEA and cocamide DEA, amine oxides, alkyl polyglucosides, ethoxylated silicones, ethoxylated alcohols, ethoxylated carboxylic acids, ethoxylated amines, ethoxylated amides, ethoxylated alkylolamides, ethoxylated alkylphenols, ethoxylated glyceryl esters, ethoxylated sorbitan esters, ethoxylated phosphate esters, glycol stearate, glyceryl stearate, and combinations thereof.

Additionally, the oil phase may include one or more antioxidants. Suitable antioxidants include, for example, BHT, BHA, Vitamin E, ceramide or ceramide derivatives, such as glucosylceramides, acylceramide, bovine ceramides, sphingolipid E, and combinations thereof.

Additionally, the oil-in-water emulsion includes a water phase having from about 0.1% (by total weight of water phase) to about 99% (by total weight of water phase) water, and a balance of components including humectants, chelating agents, and preservatives. Suitable humectants may include glycerin, glycerin derivatives, sodium hyaluronate, betaine, amino acids, glycosaminoglycans, honey, sorbitol, glycols, polyols, sugars, hydrogenated starch hydrolysates, salts of PCA, lactic acid, lactates, and urea. A particularly preferred humectant is glycerin.

Chelating agents may act to enhance preservative efficacy, and bind metals that could discolor the emulsion or hinder emulsion stability. Suitable chelating agents include, for example, disodium ethylenediamine tetraacetic acid (EDTA), commercially available from the Dow Chemical Company under the name VERSENE $Na_2$.

Additionally, as noted above, the water phase may include one or more preservatives. Suitable preservatives include, for example, the lower alkyl esters of para-hydroxybenzoates such as methylparaben, propylparaben, isobutylparaben, and mixtures thereof, benzyl alcohol, DMDM Hydantoin, and benzoic acid.

In one embodiment, the phases are mixed with one or more thickeners to provide a thicker emulsion. Specifically, when the emulsion is a hydrogel, basic pH adjusters, such as sodium hydroxide, are preferably used to thicken the emulsion.

A variety of thickeners may be used in the phases described herein. In one embodiment, the thickener may be a cellulosic thickener or gum. Examples of suitable cellulosic or gum thickeners include xanthan gum, agar, alginates, carrageenan, furcellaran, guar, cationic guar, gum arabic, gum tragacanth, karaya gum, locust bean gum, dextran, starch, modified starches, gellan gum, carboxymethylcellulose, hydroxypropylcellulose, hydroyethylcellulose, propylene glycol alginate, hydroxypropyl guar, amylopectin, cellulose gum, chitosan, modified chitosan, hydroxypropyl methylcellulose, microcrystalline cellulose, silica, fumed silica, colloidal silica, dehydroxanthan gum, non-acrylic based carbomers, and combinations thereof.

Alternately or in addition, the thickener may be an acrylic based polymer. Non-limiting examples of suitable acrylic based polymer thickeners include acrylates/$C_{10}$-$C_{30}$ alkyl acrylate crosspolymers, certain carbomers, acrylates copolymers, aminoacrylates copolymers, and combinations thereof. Examples of commercially available acrylic based polymer thickeners include Structure® Plus (National Starch & Chemical, Bridgewater, N.J.), which is an acrylates/aminoacrylates/$C_{10-30}$ alkyl PEG-20 itaconate copolymer, Carbopol® Aqua SF-1 Polymer (Noveon, Cleveland Ohio), which is an acrylates copolymer, Pemulen® TR-1 and TR-2 and Carbopol® ETD 2020 (available from Noveon), which are acrylates/C10-30 alkyl acrylates crosspolymers, and the Carbopol® Ultrez series of polymers (available from Noveon), which are carbomers.

In one embodiment, such when using a hydrogel as described above, the phase (e.g., hydrogel) may be formulated using an acid-sensitive thickener and/or a base-sensitive thickener. As the names suggest, acid-sensitive thickeners are activated (i.e., swell or "thicken") upon contact with an acidic agent, while base-sensitive thickeners are activated upon contact with an alkaline agent. An acid- or base-sensitive thickener may be combined with other phase components prior to activation, and activated by contact with an acidic or alkaline agent after the acid- or base-sensitive thickener is dispersed throughout the phase.

Examples of suitable acid-sensitive thickeners for use in the phases include the Structure® Plus (National Starch & Chemical, Bridgewater, N.J.) thickener, described above. The acid-sensitive thickeners may be activated by contact with any of a wide range of acidic agents including, for example, glycolic acid, lactic acid, phosphoric acid, citric acid, other organic acids, and similar acidic agents. Acid sensitive thickeners are generally activated over a pH range of from about 3 to about 9, and more typically over a pH range of from about 3 to about 7. The Structure® Plus thickener is typically activated over a pH range of from about 3 to about 9.

Examples of suitable base-sensitive thickeners include the Carbopol® Aqua SF-1 Polymer (Noveon, Cleveland Ohio) thickener, described above, as well as the Pemulen® TR-1 and TR-2 thickeners (available from Noveon), the Carbopol® ETD 2020 thickeners (available from Noveon), and the Carbopol® Ultrez series of thickeners (available from Noveon), all described above, and other carbomers and starches, and combinations thereof. The base-sensitive thickeners may be activated by contact with any of a wide range of alkaline agents including, for example, various metal hydroxides and amines, and other similar alkaline agents. Non-limiting examples of suitable metal hydroxides include potassium hydroxide and sodium hydroxide. Non-limiting examples of suitable amines include triethanolamine, diethanolamine, monoethanolamine, tromethamine, aminomethylpropanol, triisopropanolamine, diisopropanolamine, tetrahydroxypropylethylenediamine, and PEG-15 cocoamine. Base sensitive thickeners are generally activated over a pH range of from about 5 to about 11, and more typically over a pH range of from about 6 to about 11.

Although described above as using a thickener with a hydrogel, it should be recognized by one skilled in the art that the above thickeners can be used with any of the phases described herein for preparing an emulsion.

In certain embodiments, one or more of the phases may include two or more different types of thickeners. For instance, the phases may include any combination of cellulosic thickeners, gum thickeners, acid-sensitive thickeners, base-sensitive thickeners, and/or acrylic based polymer thickeners.

While as disclosed herein in terms of mixing phases to prepare the emulsions, it should it be recognized that one emulsion, prepared using any method known in the art, can be mixed with one or more additional phases to make a second emulsion using the ultrasonic mixing system and the methods described herein without departing from the scope of the present disclosure. For example, in one embodiment, a water-in-oil-in-water emulsion is prepared and is delivered via a first inlet port into the interior space of the treatment chamber housing and a separate phase (i.e., a water phase, as described above) is delivered via a second inlet port into the interior space of the treatment chamber housing. The ultrasonic mixing system (and, more particularly, the waveguide assembly), operating in the predetermined frequency as described above, mixes the water-in-oil emulsion with the water phase to produce a water-in-oil-in-water emulsion.

In one embodiment, one or more the phases are heated prior to being delivered to the treatment chamber. Specifically, with some emulsions, while some or all of the individual phases have a relatively low viscosity (i.e., a viscosity below 100 cps), the other phases or the resulting-emulsion that is prepared from the phases has a high viscosity (i.e., a viscosity greater than 100 cps), which can result in clumping of the emulsion and clogging of the outlet port of the treatment chamber. For example, many water-in-oil emulsions can suffer from clumping during mixing. In these types of emulsions, the water and/or oil phases are typically heated to a temperature of approximately 40° C. or higher prior to being mixed. Suitably, one or more of the phases can be heated to a temperature of from about 70° C. to about 100° C. prior to being delivered to the treatment chamber via the inlet ports.

Typically, the oil phase and water phase are delivered to the treatment chamber at a flow rate of from about 1 gram per minute to about 100,000 grams per minute. In one embodiment, the oil phase and water phase have different flow rates. By way of example, in one particular embodiment, the oil phase can be delivered via the first inlet port at a flow rate of from about 1 gram per minute to about 10,000 grams per minute, and the water phase can be delivered via the second inlet port at a flow rate of from about 1 gram per minute to about 10,000 grams per minute. In an alternative embodiment, the oil phase and water phase are delivered into the interior of the treatment chamber at equal flow rates.

In accordance with the above embodiment, as the water and oil phases continue to flow upward within the chamber, the waveguide assembly, and more particularly the horn assembly, is driven by the drive system to vibrate at a predetermined ultrasonic frequency to mix the phases, thereby preparing the emulsion. Specifically, in response to ultrasonic excitation of the horn, the agitating members that extend outward from the outer surface of the horn dynamically flex/bend relative to the horn, or displace transversely (depending on the longitudinal position of the agitating member relative to the nodal region of the horn).

The phases continuously flow longitudinally along the flow path between the horn assembly and the inner surface of the housing sidewall so that the ultrasonic vibration and the dynamic motion of the agitating members cause cavitation in the phases to further facilitate agitation. The baffle members disrupt the longitudinal flow of liquid along the inner surface of the housing sidewall and repeatedly direct the flow transversely inward to flow over the vibrating agitating members.

As the mixed emulsion flows longitudinally downstream past the terminal end of the waveguide assembly, an initial back mixing of the emulsion also occurs as a result of the dynamic motion of the agitating member at or adjacent the terminal end of the horn. Further downstream flow of the emulsion results in the agitated liquid providing a more uniform mixture of the phases prior to exiting the treatment chamber via the outlet port.

The present disclosure is illustrated by the following examples which are merely for the purpose of illustration and are not to be regarded as limiting the scope of the disclosure or manner in which it may be practiced.

Example 1

In this Example, the ability of the ultrasonic mixing system of the present disclosure to mix an oil phase and aqueous liquid phase to form an oil-in-water type emulsion was analyzed. Specifically, the ability of the ultrasonic mixing system to mix dispersions of mineral oil into a diluted wet wipes solution was analyzed.

The diluted wet wipe solution included 4.153% (by weight) KIMSPEC AVE® (commercially available from Rhodia, Inc., Cranbury, N.J.) and 95.848% (by weight) purified water. The solution was prepared by mixing the KIM-SPEC AVE® into water using a propeller mixer, available from IKA® EUROSTAR, IKA Works Co., Wilmington, N.C.), rotating at a speed of about 540 revolutions per minute (rpm). Four separate samples of the diluted wet wipe solution were prepared. The solution for each sample was delivered to a first inlet port of the ultrasonic mixing system of FIG. 1.

Additionally, a flow of mineral oil, available as Penreco® Drakeol® LT mineral oil N.F. from Penreco Co., The Woodlands, Tex.) was delivered to a second inlet port of the ultrasonic mixing system shown in FIG. 1. The weight ratio of mineral oil to wet wipe solution was 1:199. Three different flow rates of the emulsion samples were used for samples A, B, and C (4000 grams per minute, 2000 grams per minute, and 1000 grams per minute, respectively). Additionally, one wet wipe solution (Sample D) was produced by adding 1% (by total weight solution) of surfactant, commercially available as Solubilisant LRI from LCW, South Plainfield, N.J.), so the weight ratio of oil to surfactant to wet wipe solution was 1:2:197. The flow rate of Sample D was 1000 grams per minute.

The ultrasonic mixing system was then ultrasonically activated using the ultrasonic drive system at a frequency of 20 kHz. After mixing in the treatment chamber, the wet wipe solutions (now having the mineral oil incorporated therein) exited the treatment chamber via the outlet port. The physical appearances of the emulsions observed are summarized in Table 1. The size and distribution of oil droplets within the emulsions so prepared were analyzed using the Laser Light Scattering Method by Micromeritics Analytical Services (Norcross, Ga.) after thirteen days of the experiment. The data on mean particle size and size distribution of the mineral oil droplets in the wet wipe solutions are shown in Table 2.

TABLE 1

| Wet Wipe Solution Sample | Flow Rate of Mineral Oil into Mixing System (g/min) | Mixing Time (minutes) | Visual Appearance of Wet Wipe Solution Containing Mineral Oil |
|---|---|---|---|
| A | 20 | 0.5 | Translucent, milk-like, no visible droplets |
| B | 10 | 1 | Milk-like; less transparent than A; no visible droplets |
| C | 5 | 2 | Milk-like; not transparent; no visible droplets |
| D | 5 | 2 | Milk-like; not transparent; no visible droplets |

TABLE 2

| Wet Wipe Solution Sample | Mean particulate diameter (μm) | Diameter 90% finer | Diameter 50% finer (Median) | Diameter 10% finer |
|---|---|---|---|---|
| A | 1.862 | 3.368 | 1.381 | 0.576 |
| B | 1.110 | 2.266 | 0.655 | 0.190 |
| C | 0.654 | 1.375 | 0.379 | 0.142 |
| D | 0.767 | 1.536 | 0.510 | 0.166 |

As shown in Table 2, the wet wipe solutions C and D, which were mixed in the ultrasonic mixing system for two minutes, had smaller particle sizes of mineral oil droplets, showing a better dispersion of mineral oil within the aqueous wet wipe solution.

Additionally, after 40 days, the appearances of the wet wipe solution samples were analyzed visually. All wet wipe solutions contained a thin creamy layer on top, but the layer was miscible with the remaining portion of the sample with slight agitation.

Example 2

In this Example, the ultrasonic mixing system of the present disclosure was used to emulsify an oil phase into a water phase to produce an oil-in-water emulsion. The ability of the ultrasonic mixing system to prepare a stable oil-in-water emulsion was analyzed and compared to an oil-in-water emulsion prepared using a traditional cold mix procedure as described above.

Three oil-in-water emulsions were prepared. Specifically, the oil-in-water emulsions were prepared by mixing 1 part mineral oil (available as Penreco® Drakeol® LT mineral oil N.F. from Penreco Co., The Woodlands, Tex.)) to 199 parts water for a mixing period of approximately 2 minutes. The first emulsion sample (Sample 1) was prepared using a propeller mixer (IKA® EUROSTAR, IKA Works, Co., Wilmington, N.C.) and using the standard cold mix batch procedure.

The other two oil-in-water emulsions (Samples 2 and 3) were prepared in the ultrasonic mixing system of FIG. 1. Specifically, to produce the oil-in-water emulsion of Sample 2 with the ultrasonic mixing system, the oil phase was added into the first inlet port at a flow rate of 20 grams per minute and the water phase was added into the second inlet port at a flow rate of 3980 grams per minute. The oil phase and water phase were mixed in the chamber for a total of 30 seconds.

Sample 3 was prepared by additionally mixing in a surfactant (Solubilisant LRI, LCW, South Plainfield, N.J.) with the oil phase in a weight ratio of surfactant to oil of 1:1. The mixed oil phase (including the surfactant) was then added at a flow rate of 24 grams per minute into the first inlet port of the ultrasonic mixing system of FIG. 1. The water phase was added into the second inlet port at a flow rate of 3980 grams per minute and mixed with the oil phase. The oil and surfactant of the oil phase and water of the water phase were added at a weight ratio of 0.3:0.3:99.4. Once the emulsions were formed, the emulsions were visually inspected and stored in two separate containers. After 30 hours, the containers were visually inspected. The results are shown in Table 3.

TABLE 3

| Sample | Mixing Method | Mixing Time (min) | Visual Observation of Physical Appearance of Emulsion Immediately After Mixing | Visual Observation of Physical Appearance of Emulsion after 30 hours |
|---|---|---|---|---|
| 1 | Hand mixer | 2.0 | Milk-like formulation for 1-2 minutes | Oil phase completely separated from water phase |
| 2 | Ultrasonic mixing system | 0.5 | Stable milk-like emulsion with no droplets | Milk-like emulsion with a few 1 mm diameter oil droplets on top; separated completely after 3 days |

TABLE 3-continued

| Sample | Mixing Method | Mixing Time (min) | Visual Observation of Physical Appearance of Emulsion Immediately After Mixing | Visual Observation of Physical Appearance of Emulsion after 30 hours |
|---|---|---|---|---|
| 3 | Ultrasonic mixing system | 0.5 | Milk-like emulsion without visible oil droplets | Milk-like emulsion without visible oil droplets |

As shown in Table 3, both of the emulsions produced using the ultrasonic mixing system remained stable until 30 hours after exiting the chamber while the emulsion prepare in the batch process separated within a couple minutes. While Sample 2 finally separated completely after about 3 days, the emulsion prepared using the oil phase that comprised SOLUBILISANT LRI remained stable for 40 days.

The oil droplets from the batch-produced oil-in-water emulsion were sized from several micrometers to several hundreds of micrometers. For the two emulsions produced using the ultrasonic mixing system, after five days of aging) the oil droplets ranged from sub-micrometers in size to a couple of micrometers.

When introducing elements of the present disclosure or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for preparing an emulsion using an ultrasonic mixing system, the method comprising:
introducing a first phase into a first inlet port of an elongate housing of a treatment chamber at a flow rate of from about 1 gram per minute to about 100,000 grams per minute;
introducing a second phase into a second inlet port of the elongate housing of the treatment chamber at a flow rate of from about 1 gram per minute to about 100,000 grams per minute;
ultrasonically activating the treatment chamber at a predetermined frequency with an elongate ultrasonic waveguide assembly extending longitudinally within the interior space of the housing to mix the first and second phases, the waveguide assembly comprising an elongate ultrasonic horn disposed at least in part intermediate the first and second inlet ports and an outlet port of the housing spaced longitudinally from the first and second inlet ports and having an outer surface located for contact with the first and second phases flowing within the housing from the first and second inlet ports to the outlet port, and a plurality of discrete agitating members in contact with and extending transversely outward from the outer surface of the horn intermediate the first and second inlet ports and the outlet port in longitudinally spaced relationship with each other, the agitating members and the horn being constructed and arranged for dynamic motion of the agitating members relative to the horn upon ultrasonic vibration of the horn at the predetermined frequency and to operate in an ultrasonic cavitation mode of the agitating members corresponding to the predetermined frequency.

2. The method as set forth in claim 1 wherein the emulsion is selected from the group consisting of oil-in-water emulsions, water-in-oil emulsions, water-in-oil-in-water emulsions, oil-in-water-in-oil emulsions, water-in-silicone emulsions, water-in-silicone-in-water emulsions, glycol-in-silicone emulsions, and high internal phase emulsions.

3. The method as set forth in claim 2 wherein the first phase and second phase are independently selected from the group consisting of an oil phase, a water phase, a silicone phase, a glycol phase, and combinations thereof.

4. The method as set forth in claim 2 wherein one of the first phase and second phase is an oil phase and the oil phase comprises from about 1% (by total weight of oil phase) to about 80% (by total weight of oil phase) oil.

5. The method as set forth in claim 4 wherein the oil is selected from the group consisting of natural oil, synthetic oil, and combinations thereof.

6. The method as set forth in claim 2 further comprising introducing a third phase via a third inlet port into the interior space of the housing, the third phase being selected from the group consisting of an oil phase, a water phase, a silicone phase, a glycol phase, and combinations thereof.

7. The method as set forth in claim 1 wherein at least one of the first phase and the second phase are heated prior to being introduced to the interior space of the housing.

8. The method as set forth in claim 1 wherein the first and second phases are ultrasonically mixed using the predetermined frequency being in a range of from about 20 kHz to about 40 kHz.

9. The method as set forth in claim 1 wherein at least one of the first and second phases further comprises a surfactant.

10. The method as set forth in claim 9 wherein the surfactant is selected from the group consisting of nonionic surfactants, anionic surfactants, cationic surfactants, amphoteric surfactants, and combinations thereof.

11. The method as set forth in claim 1 wherein at least one of the first and second phases further comprises an antioxidant.

12. The method as set forth in claim 11 wherein the antioxidant is selected from the group consisting of butylated hydroxytoluene, butylated hydroxyanisole, ceramides, ceramide derivatives, and combinations thereof.

13. The method as set forth in claim 1 wherein at least one of the first and second phases further comprises a compound selected from the group consisting of humectants, chelating agents, preservatives, thickeners, and combinations thereof.

14. The method as set forth in claim 13 wherein the thickener is selected from the group consisting of cellulosic thickeners, gums, acrylic based polymers, acid-sensitive thickeners, and base-sensitive thickeners.

* * * * *

UNITED STATES PATENT AND TRADEMARK OFFICE
CERTIFICATE OF CORRECTION

PATENT NO. : 8,143,318 B2  
APPLICATION NO. : 13/150760  
DATED : March 27, 2012  
INVENTOR(S) : Scott W. Wenzel et al.

Page 1 of 1

It is certified that error appears in the above-identified patent and that said Letters Patent is hereby corrected as shown below:

In the Specification

In Column 2, Line 13, delete "closed at" and insert -- closed at at -- therefor.

In Column 2, Line 57, delete "closed at" and insert -- closed at at -- therefor.

In Column 3, Line 27, delete "closed at" and insert -- closed at at -- therefor.

In Column 15, Line 40, delete "Chemy" and insert -- Cherry -- therefor.

In Column 15, Line 54, delete "Moring a" and insert -- Moringa -- therefor.

In Column 17, Lines 50-51, delete "[S-3-hydroxypropyl-5-hexadecylsulfonio]" and insert -- [S-3-hydroxypropyl-S-hexadecylsulfonio] -- therefor.

Signed and Sealed this
Twelfth Day of May, 2015

Michelle K. Lee
*Director of the United States Patent and Trademark Office*